US009265054B2

(12) United States Patent
Miyauchi

(10) Patent No.: US 9,265,054 B2
(45) Date of Patent: Feb. 16, 2016

(54) BASE STATION, MOBILE STATION, CONTROL METHOD, SETTING METHOD, AND COMMUNICATION SYSTEM

(71) Applicant: FUJITSU LIMITED, Kawasaki-shi, Kanagawa (JP)

(72) Inventor: Yusuke Miyauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 13/888,079

(22) Filed: May 6, 2013

(65) Prior Publication Data

US 2014/0133327 A1   May 15, 2014

Related U.S. Application Data

(63) Continuation of application No. PCT/JP2010/070240, filed on Nov. 12, 2010.

(51) Int. Cl.
*H04W 72/08* (2009.01)
*H04W 72/12* (2009.01)
*H04W 28/02* (2009.01)
*H04W 52/24* (2009.01)
*G06F 12/00* (2006.01)
*H04L 1/08* (2006.01)
*H04L 1/20* (2006.01)
*H04L 1/18* (2006.01)

(52) U.S. Cl.
CPC ............ *H04W 72/085* (2013.01); *G06F 12/00* (2013.01); *H04W 52/241* (2013.01); *H04W 72/1231* (2013.01); *H04L 1/08* (2013.01); *H04L 1/1819* (2013.01); *H04L 1/1825* (2013.01); *H04L 1/1887* (2013.01); *H04L 1/20* (2013.01); *H04W 28/0205* (2013.01); *H04W 28/0236* (2013.01)

(58) Field of Classification Search
None
See application file for complete search history.

(56) References Cited

U.S. PATENT DOCUMENTS

| 8,982,755 | B1* | 3/2015 | Shah et al. ............... 370/311 |
| 2005/0002422 | A1* | 1/2005 | Morihiro et al. .......... 370/477 |
| 2009/0245225 | A1 | 10/2009 | Tseng |
| 2010/0042884 | A1* | 2/2010 | Kuo et al. ............... 714/748 |
| 2010/0192035 | A1* | 7/2010 | Sagfors et al. ........... 714/748 |
| 2011/0044277 | A1* | 2/2011 | Moulsley et al. .......... 370/329 |
| 2011/0173519 | A1* | 7/2011 | Kuri et al. ............... 714/799 |

(Continued)

FOREIGN PATENT DOCUMENTS

JP   11-331944 A   11/1999
JP   2003-37606 A   2/2003

(Continued)

OTHER PUBLICATIONS

Ericsson, "Text Proposal for TTI bundling", 3GPP TSG-RAN WG2 #61bis, R-081466, 3GPP, Shenzhen, China, Mar. 31, 2008, 7 pages.

(Continued)

*Primary Examiner* — Ashley Shivers
(74) *Attorney, Agent, or Firm* — Arent Fox LLP

(57) ABSTRACT

A base station communicates with a mobile station that continuously transmits a predetermined number of the same packets for predetermined time intervals. The base station includes a measuring unit that measures reception quality of packets received from the mobile station, among the predetermined number of the same packets that are continuous; and a control unit performing control of causing the mobile station to set the predetermined number based on the reception quality measured by the measuring unit.

23 Claims, 23 Drawing Sheets

(56) References Cited

U.S. PATENT DOCUMENTS

2011/0255494 A1   10/2011  Okubo et al.
2014/0056237 A1*  2/2014  Eriksson et al. ............. 370/329

FOREIGN PATENT DOCUMENTS

| | | |
|---|---|---|
| JP | 2004-260634 A | 9/2004 |
| JP | 2005-57366 A | 3/2005 |
| JP | 2006-343984 A | 12/2006 |
| JP | 2009-194606 A | 8/2009 |
| JP | 2009-253981 A | 10/2009 |
| JP | 2009-290451 A | 12/2009 |
| WO | WO 2010/053144 A1 | 5/2010 |

OTHER PUBLICATIONS

International Search Report issued in PCT/JP2010/070240, mailed Dec. 21, 2010, 4 pages.

TSG-RAN WG2, "LS on TTI Bunding", 3GPP TSG-RAN WG2 Meeting #62, R2-082871, 3GPP, Kansas City, USA, May 5, 2008, 1 page.

\* cited by examiner

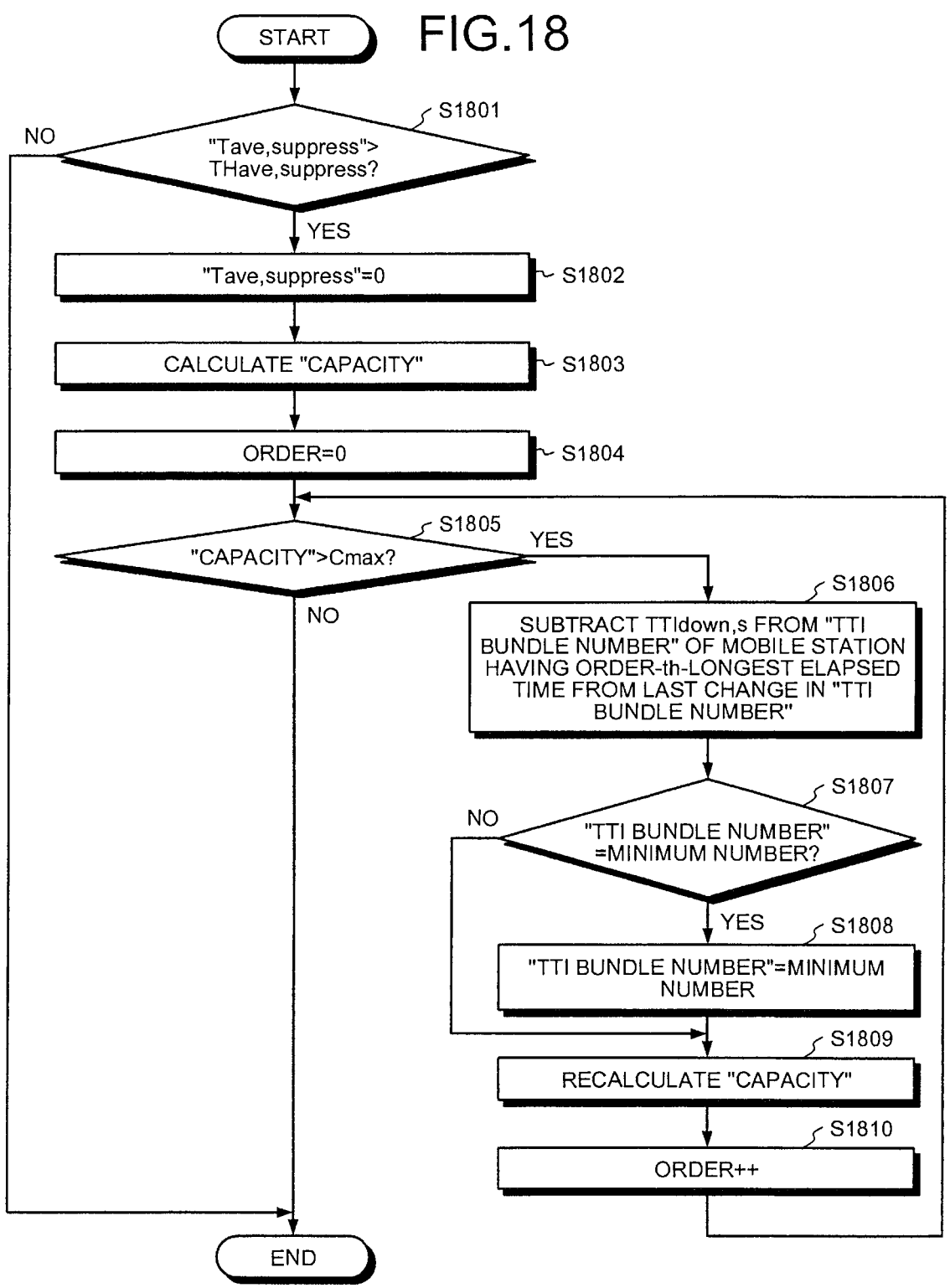

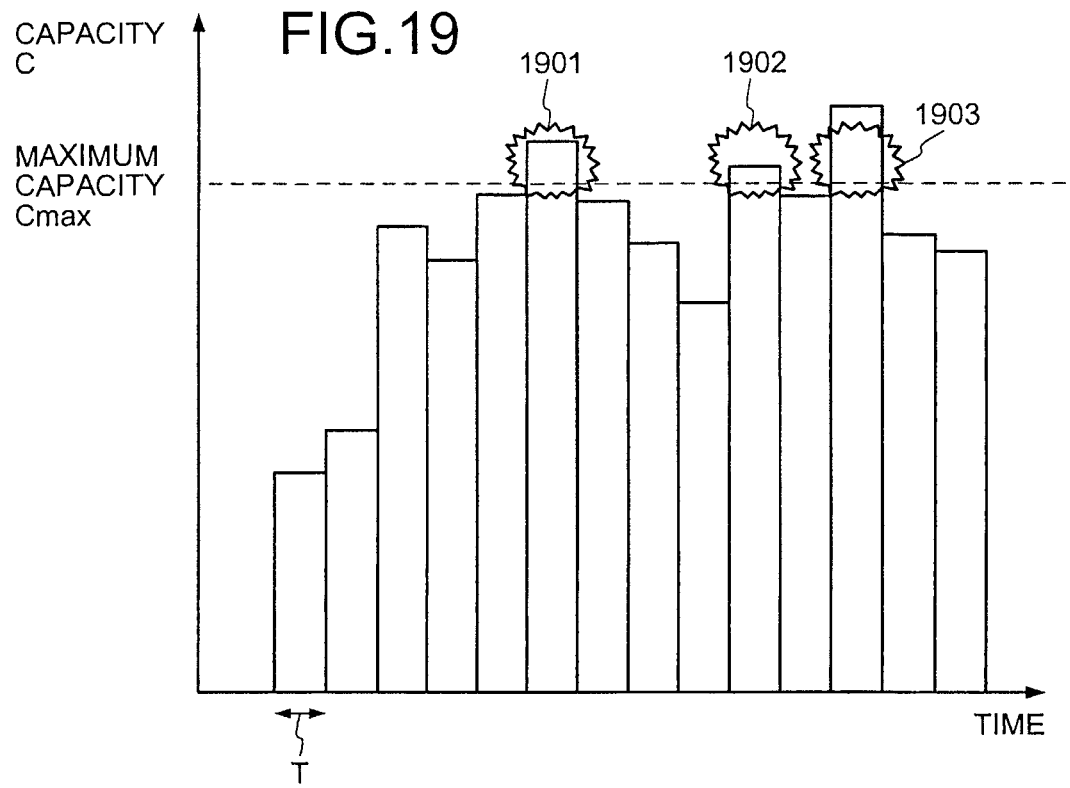

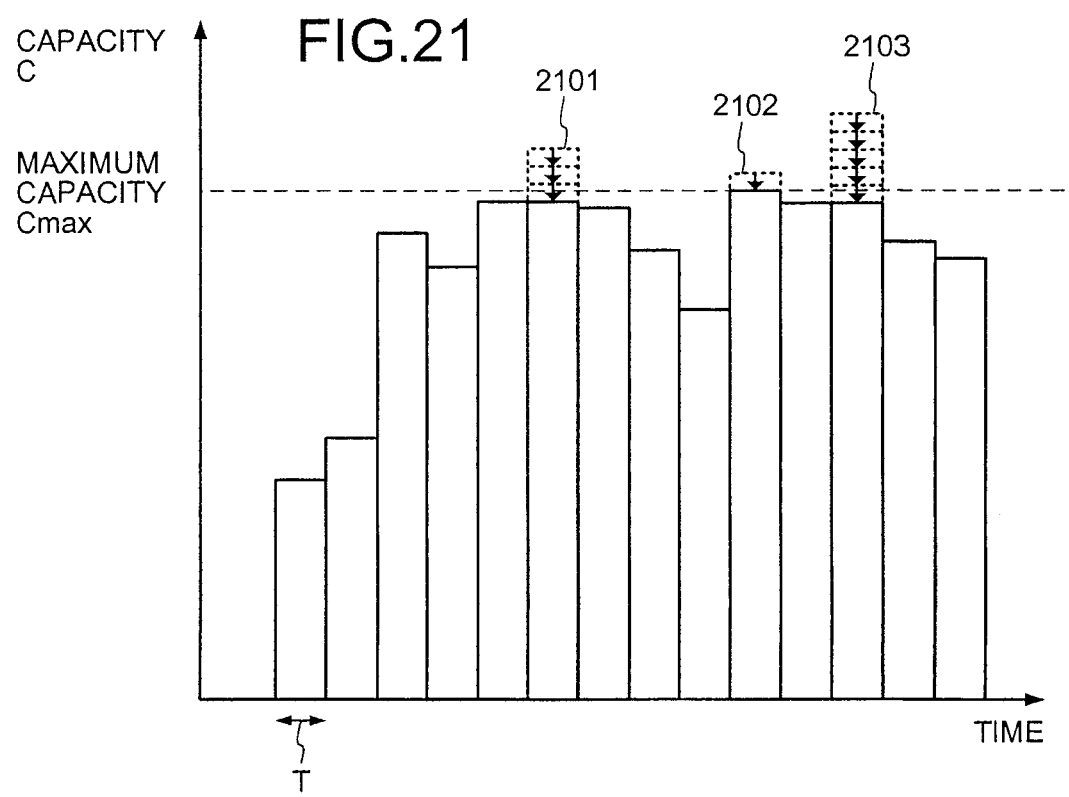

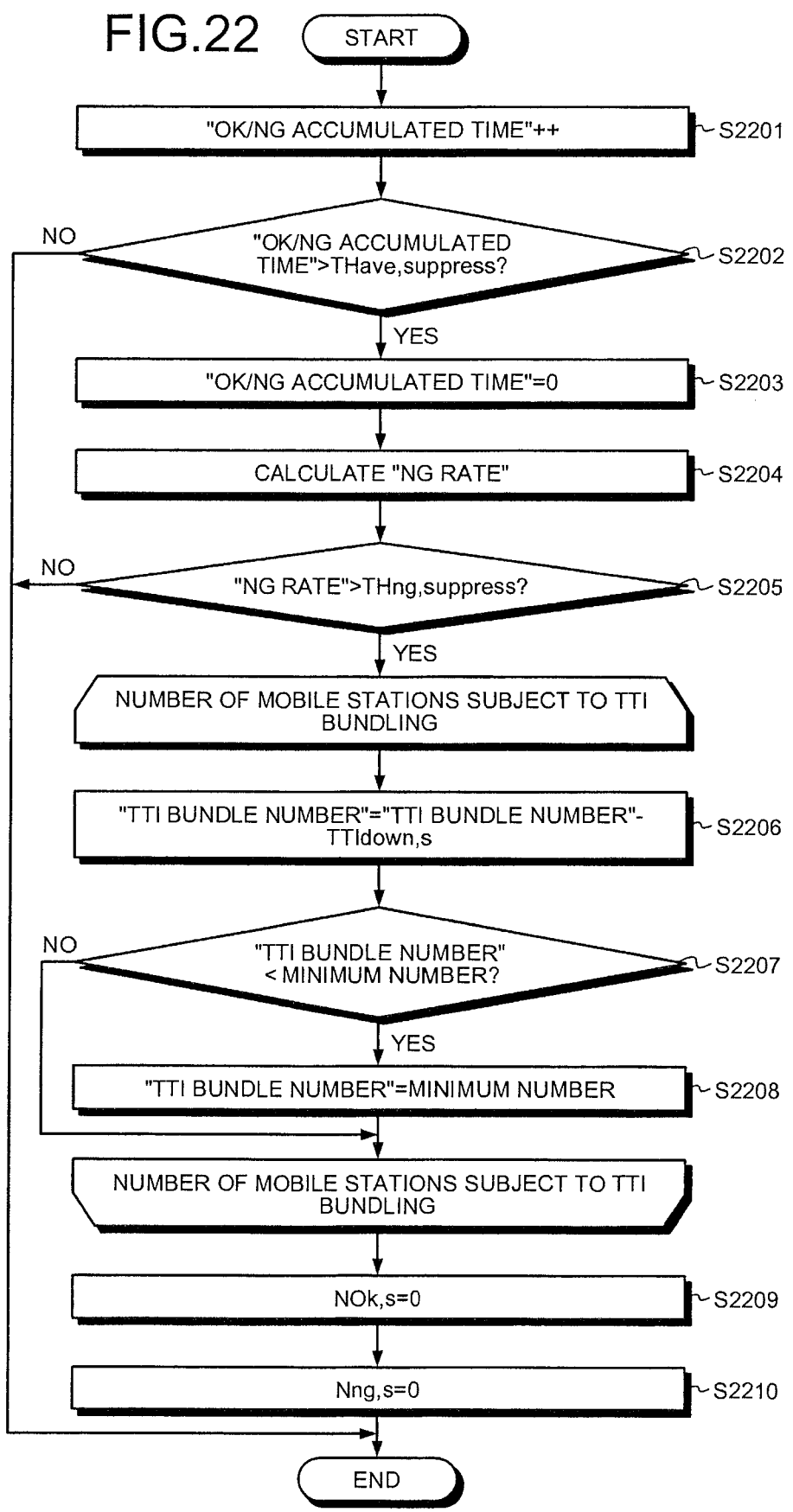

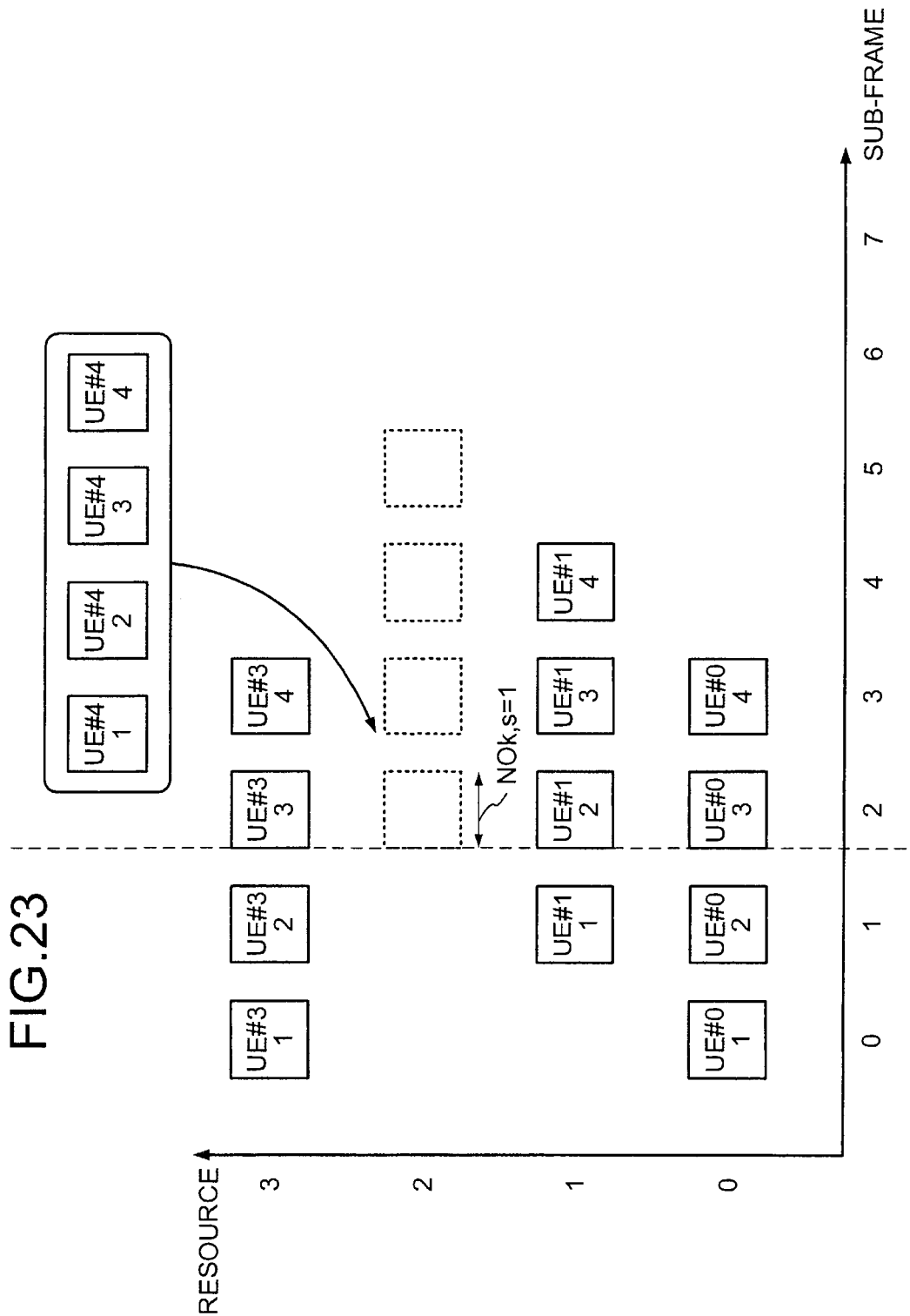

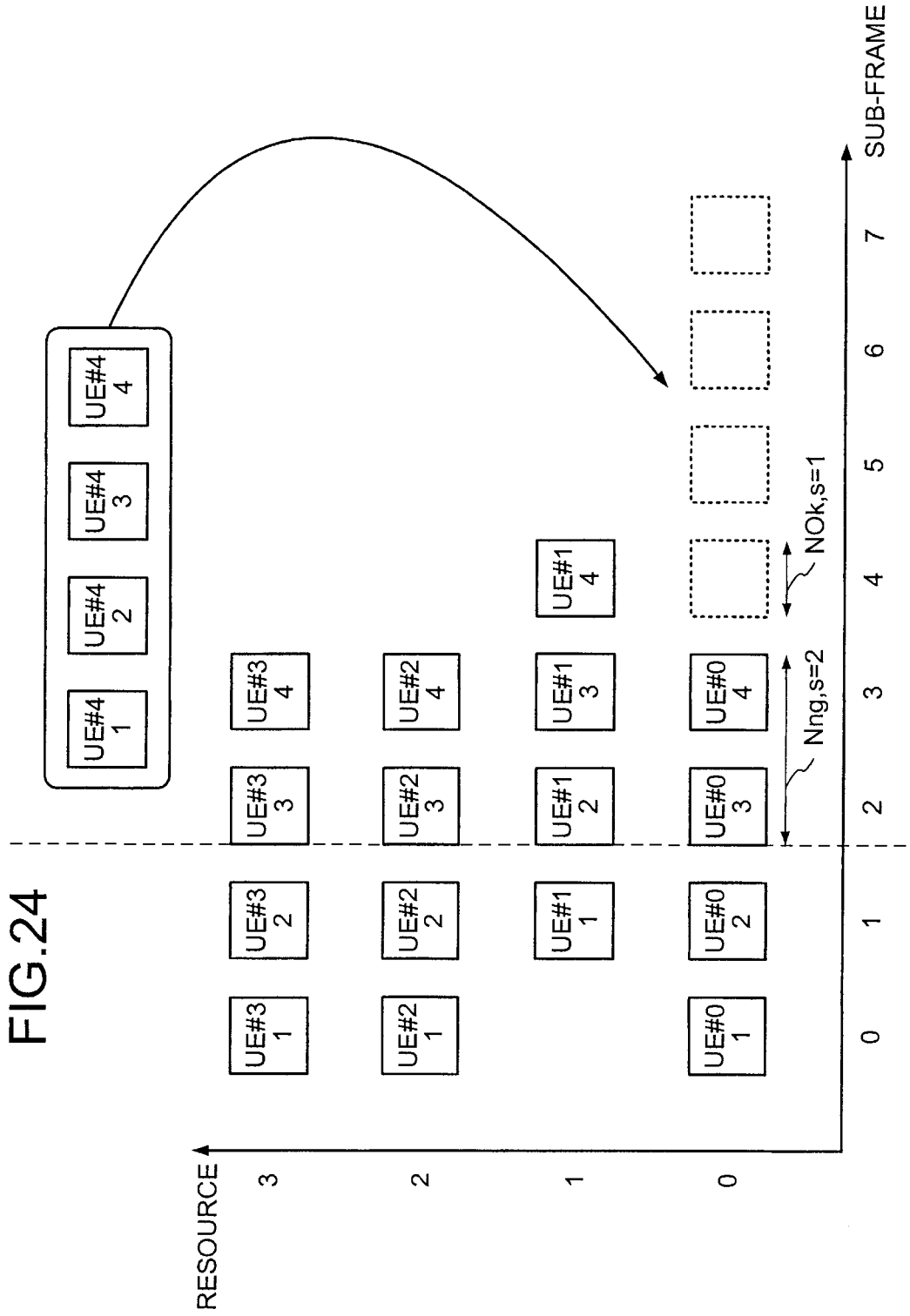

US 9,265,054 B2

BASE STATION, MOBILE STATION, CONTROL METHOD, SETTING METHOD, AND COMMUNICATION SYSTEM

CROSS REFERENCE TO RELATED APPLICATIONS

This application is a continuation application of International Application PCT/JP2010/070240, filed on Nov. 12, 2010 and designating the U.S., the entire contents of which are incorporated herein by reference.

FIELD

The embodiments discussed herein are related to a base station, a mobile station, a control method, a setting method, and a communication system.

BACKGROUND

In Long Term Evolution (LTE), a short transmission time interval (TTI) such as 1 [ms] is employed to realize a higher data rate. A shorter TTI shortens the round trip time (RTT) required for retransmission control and reduces system delay.

On the other hand, in a system with a short TTI, for example, a mobile station (user equipment (UE)) located at a cell end cannot sufficiently ensure energy for transmission because of limited transmission power. Therefore, retransmission may frequently occur even in the case of a smaller packet of Voice over Internet Protocol (VoIP), etc. In this case, for example, a delay of 8 [ms] (for RTT) occurs for each retransmission. Particularly, an application requiring real-time performance such as VoIP is vulnerable to such a delay and a mechanism for reducing delay is desired.

LTE employs TTI bundling as a technique against such a delay (see, for example, Japanese Laid-Open Patent Publication No. 2009-253981). The TTI bundling is a technique of continuously transmitting the same packets for several TTIs and combining the packets on the reception side to achieve improved reception quality.

However, the conventional technique has a problem that communication efficiency cannot sufficiently be improved.

For example, 3rd Generation Partnership Project (3GPP) defines that continuous transmission is executed for four TTIs, i.e., the same number as that of types of redundancy versions (RV). However, transmission for four TTIs is not always necessary and transmission for first several TTIs may ensure sufficient reception quality and make a cyclic redundancy check (CRC) OK (error-free) in some cases.

For example, in the TTI bundling with four-TTI continuous transmission, if a first mobile station acquires a CRC result of OK in two TTIs, the first mobile station executes the continuous transmission for four TTIs.

Therefore, a second mobile station having available resources must wait until the first mobile station completes the four-TTI continuous transmission. This is not efficient in terms of resource utilization and power consumption.

On the other hand, in an environment with poor communication channels, transmission for four TTIs cannot ensure sufficient reception quality and retransmission control may occur. Particularly, since a short TTI of 1 [ms] is employed and the same frequency resource is used for the continuous transmission, the TTI bundling is susceptible to burst noise and local deterioration of frequency characteristics. If the retransmission control occurs in the TTI bundling, resources and transmission power for four TTIs are further used, thereby increasing the resources used, power consumption, delay, etc.

In the TTI bundling, a base station feeds back ACK or NACK after receiving all the bundled signals, for example. Therefore, if retransmission occurs in the TTI bundling, retransmission control takes more time as compared to when the TTI bundling is not performed.

Since the same frequency resource is ensured for multiple TTIs in the TTI bundling, flexibility in resource allocation drops. Therefore, for example, if resources cannot be ensured for multiple continuous TTIs, transmission is postponed. Particularly, if more mobile stations are accommodated by a base station, the probability that mobile stations contend for resources increases and therefore, frequent suspension of transmission can be expected.

SUMMARY

According to an aspect of an embodiment, a base station communicates with a mobile station that continuously transmits a predetermined number of the same packets for predetermined time intervals. The base station includes a measuring unit that measures reception quality of packets received from the mobile station, among the predetermined number of the same packets that are continuous; and a control unit performing control of causing the mobile station to set the predetermined number based on the reception quality measured by the measuring unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a flowchart of a third specific example of the determining process of the TTI bundle number on the basis of a system;

FIG. 19 is a diagram of an operation example of the first to third specific examples of the determining process of the TTI bundle number on the basis of a system;

FIG. 20 is a diagram of an operation example of the first specific example of the determining process of the TTI bundle number on the basis of a system;

FIG. 21 is a diagram of an operation example of the second and third specific examples of the determining process of the TTI bundle number on the basis of a system;

FIG. 22 is a flowchart of a fourth specific example of the determining process of the TTI bundle number on the basis of a system;

FIG. 23 is a first diagram of an operation example of the fourth specific example of the determining process of the TTI bundle number on the basis of a system; and FIG. 24 is a second diagram of an operation example of the fourth specific example of the determining process of the TTI bundle number on the basis of a system.

DESCRIPTION OF EMBODIMENTS

Preferred embodiments of the present invention will be explained with reference to the accompanying drawings.

Figure 1:
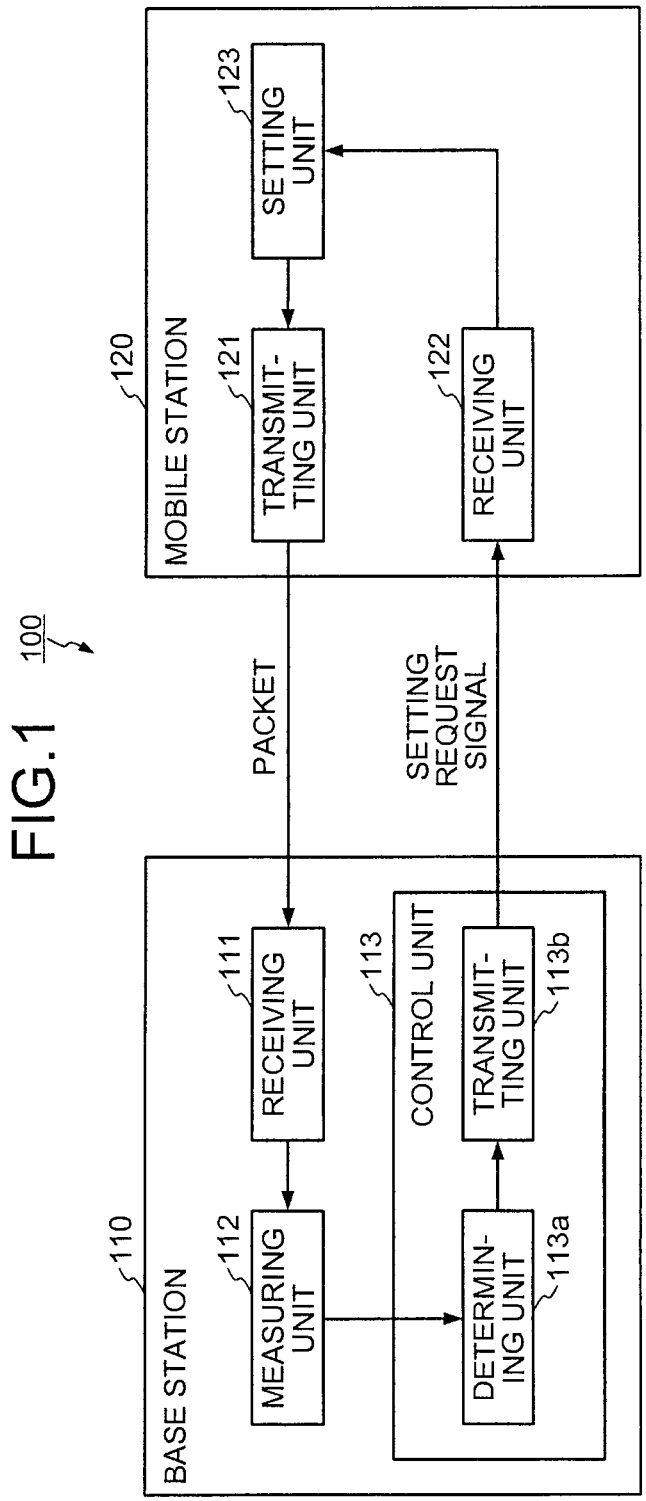
FIG. 1 is a diagram of a communication system according to a first embodiment.

FIG. 1 is a diagram of a communication system according to a first embodiment. As depicted in FIG. 1, a communication system 100 according to the first embodiment includes a base station 110 and a mobile station 120. The mobile station 120 performs TTI bundling to transmit a TTI bundle number (predetermined number) of the same packets continuously for TTIs (predetermined time intervals). One or more mobile stations 120 may be present.

The base station 110 includes a receiving unit 111, a measuring unit 112, and a control unit 113. The receiving unit 111 receives packets transmitted from the mobile station 120. The receiving unit 111 outputs the received packets to the measuring unit 112.

The measuring unit 112 measures reception quality of packets output from the receiving unit 111 among the predetermined number of the same continuous packets. The reception quality of packets includes, for example, an error detection result of the packets. The reception quality of packets may include, for example, the number of retransmissions (retransmission number) of packets by the mobile station 120 based on an error result of a packet group transmitted in the TTI bundle number of continuous TTIs. If multiple mobile stations 120 are present, the measuring unit 112 measures the reception quality for each of the mobile stations 120, for example. The measuring unit 112 outputs the measured reception quality to the control unit 113.

The control unit 113 provides TTI bundle number control causing the mobile station 120 to set the TTI bundle number, based on the reception quality output from the measuring unit 112. If the measuring unit 112 outputs the reception quality for each of the mobile stations 120, the control unit 113 provides the TTI bundle number control for each of the mobile stations 120.

The control unit 113 includes a determining unit 113a and a transmitting unit 113b. The determining unit 113a determines the TTI bundle number based on the reception quality. The determining unit 113a outputs the determined TTI bundle number to the transmitting unit 113b. The transmitting unit 113b transmits to the mobile station 120, a setting request signal indicating that a change should be made to the TTI bundle number output from the determining unit 113a.

The mobile station 120 includes a transmitting unit 121, a receiving unit 122, and a setting unit 123. The transmitting unit 121 performs TTI bundling to transmit to the base station 110, the same packets of the set TTI bundle number, for continuous TTIs. The transmitting unit 121 performs the TTI bundling by the TTI bundle number set by the setting unit 123.

The receiving unit 122 receives the setting request signal transmitted from the base station 110. The setting request signal is a signal that indicates the TTI bundle number determined by the base station 110 based on the reception quality of packets transmitted by the transmitting unit 121. The receiving unit 122 outputs the received setting request signal to the setting unit 123. The setting unit 123 sets the TTI bundle number of the transmitting unit 121 to the TTI bundle number indicated by the setting request signal output from the receiving unit 122.

Figure 2:
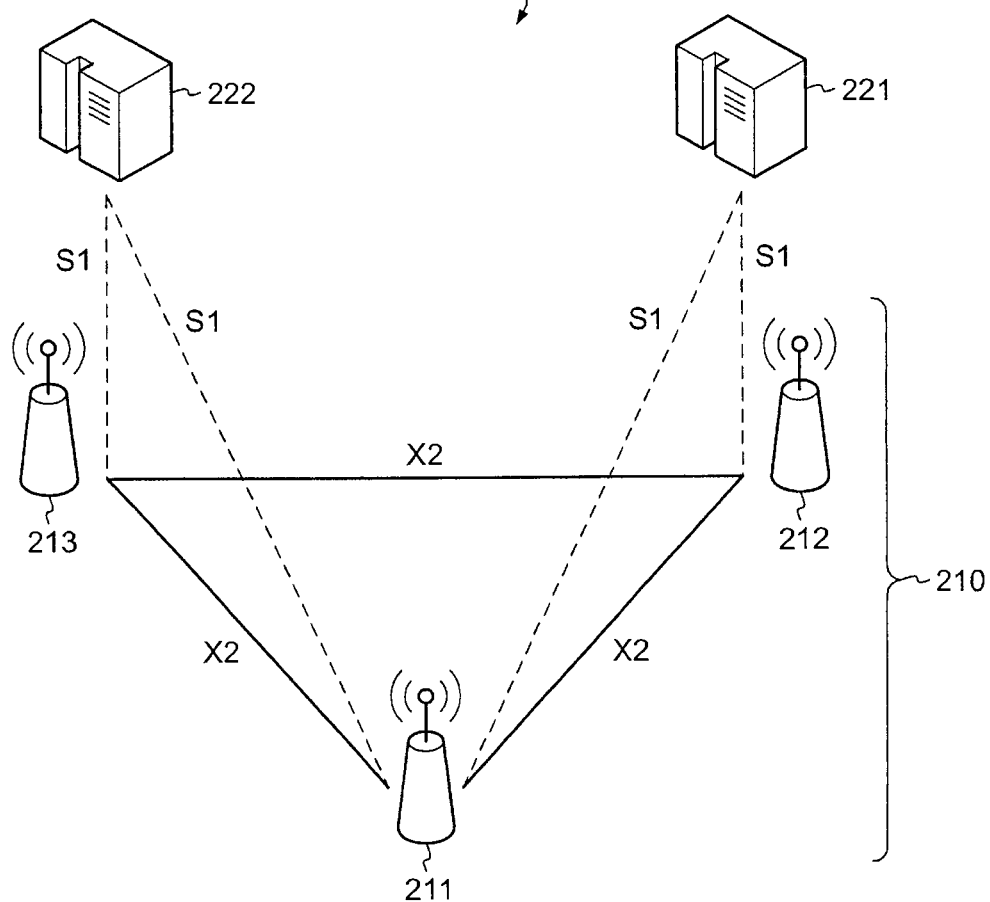
FIG. 2 is a diagram of an application example of the communication system.

FIG. 2 is a diagram of an application example of the communication system. The communication system 100 depicted in FIG. 1 is applicable to a communication system 200 depicted in FIG. 2. The communication system 200 is a communication system of LTE. The communication system 200 includes Evolved-Universal Terrestrial Radio Access Network (E-UTRAN) 210 and upper-level communication stations 221 and 222.

The E-UTRAN 210 includes base stations 211 to 213 (eNB). The base stations 211 to 213 are connected through X2 interfaces to each other. The base stations 211 to 213 are connected through S1 interfaces to the upper-level communication stations 221 and 222. The upper-level communication stations 221 and 222 are Serving-Gateways (S-GW) or Mobility Management Entities (MME), for example. The upper-level communication stations 221 and 222 are connected to a core network.

The base station 110 depicted in FIG. 1 is applicable to at least any one of the base stations 211 to 213, for example. The mobile station 120 depicted in FIG. 1 is applicable to a mobile station wirelessly communicating with the base station to which the base station 110 is applied among the base stations 211 to 213.

Figure 3:
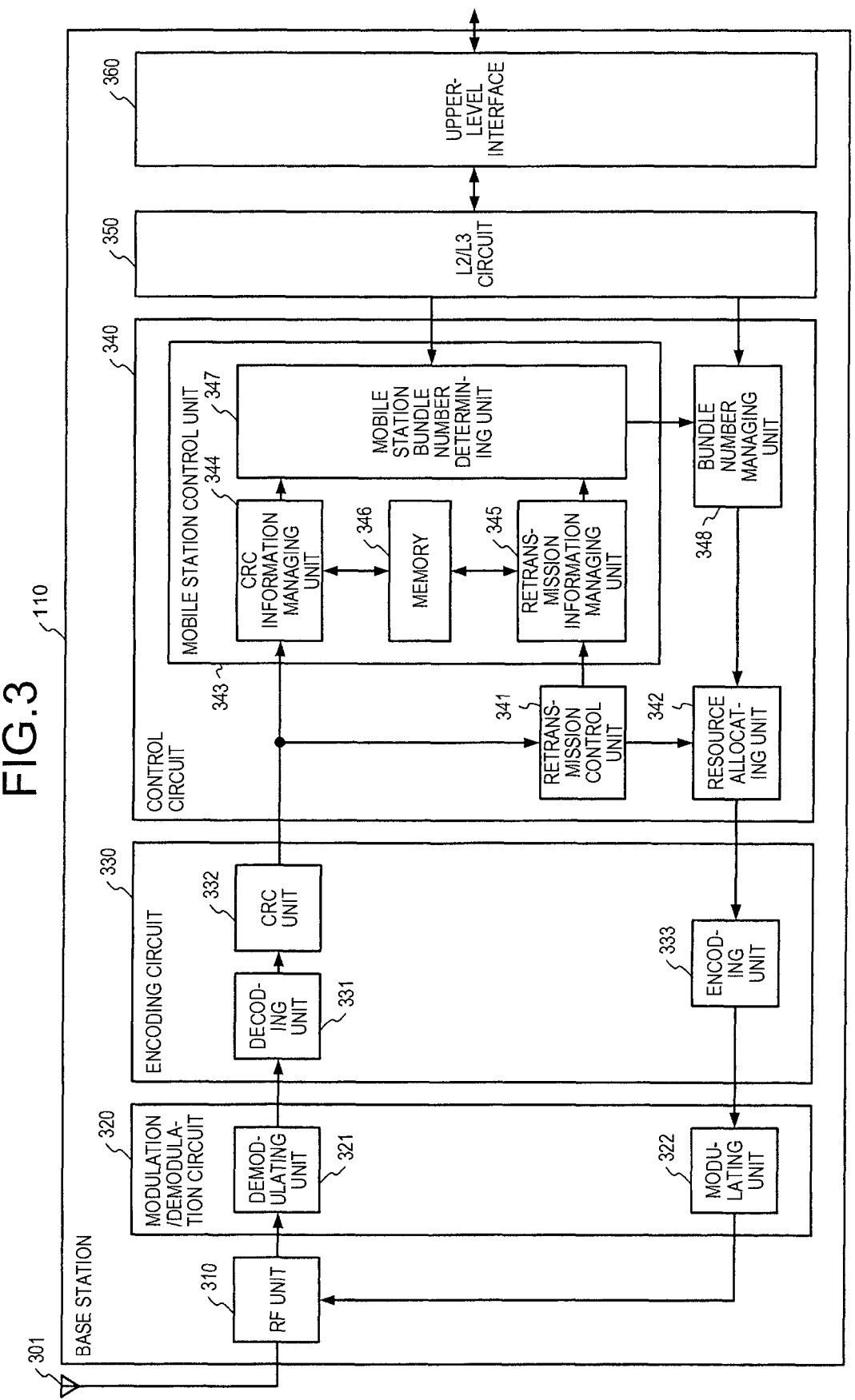
FIG. 3 is a diagram of an example of a configuration of a base station according to the first embodiment.

FIG. 3 is a diagram of an example of a configuration of a base station according to the first embodiment. As depicted in FIG. 3, the base station 110 includes, for example, an antenna 301, an RF unit 310, a modulation/demodulation circuit 320, an encoding circuit 330, a control circuit 340, an L2/L3 circuit 350, and an upper-level interface 360. The modulation/demodulation circuit 320, the encoding circuit 330, the control circuit 340, and the L2/L3 circuit 350 can be implemented by one or more digital signal processors (DSP), for example.

The receiving unit 111 and the transmitting unit 113b depicted in FIG. 1 can be implemented by the antenna 301, the modulation/demodulation circuit 320, the encoding circuit 330, and the control circuit 340, for example. The measuring unit 112 and the determining unit 113a depicted in FIG. 1 can be implemented by the control circuit 340, for example. To the base station 110, for example, Hybrid Automatic Repeat Request (HARQ) is applied. For example, the base station 110 executes a CRC of packets received from the mobile station 120 and provides retransmission control depending on a result of the CRC.

The antenna 301 outputs to the RF unit 310, an RF signal wirelessly received from the mobile station 120. The antenna 301 wirelessly transmits to the mobile station 120, an RF signal output from the RF unit 310. The RF unit 310 converts the RF signal output from the antenna 301 into a base band signal before output to the modulation/demodulation circuit 320. The RF unit 310 converts a base band signal output from the modulation/demodulation circuit 320 into an RF signal before output to the antenna 301.

The modulation/demodulation circuit 320 includes a demodulating unit 321 and a modulating unit 322. The demodulating unit 321 demodulates a signal output from the RF unit 310. The demodulating unit 321 outputs the demodulated signal to the encoding circuit 330. The modulating unit 322 modulates a signal output from the encoding circuit 330. The modulating unit 322 outputs the modulated signal to the RF unit 310.

The encoding circuit 330 includes a decoding unit 331, a CRC unit 332, and an encoding unit 333. The decoding unit 331 decodes a signal output from the modulation/demodulation circuit 320. The decoding unit 331 outputs a packet acquired by decoding to the CRC unit 332.

The CRC unit 332 executes a CRC (error detection) of a packet output from the decoding unit 331. The CRC unit 332 outputs the packet subjected to the CRC to the control circuit 340 along with CRC information that indicates a CRC result. The CRC information is information related to an error detection result of a packet and is information that indicates whether a packet has an error (OK or NG). The encoding unit 333 encodes a packet output from the control circuit 340. The encoding unit 333 outputs to the modulation/demodulation circuit 320, a signal acquired by encoding.

The control circuit 340 includes a retransmission control unit 341, a resource allocating unit 342, a mobile station control unit 343, and a bundle number managing unit 348. The retransmission control unit 341 provides retransmission control of a media access control (MAC) layer based on CRC information, for a packet output from the encoding circuit 330.

For example, if a CRC result of OK is acquired from at least one packet in a packet group transmitted through the TTI bundling, the retransmission control unit 341 outputs to the resource allocating unit 342, ACK (affirmative signal) for the source mobile station 120 of the packet group. ACK is a signal indicating that a packet is normally received.

If a CRC result of NG is acquired from all the packets in a packet group transmitted through the TTI bundling, the retransmission control unit 341 outputs NACK (negative signal) for the source mobile station 120 of the packet group to the resource allocating unit 342. NACK is a signal indicating that a packet is not received normally and requesting retransmission of the packet. If NACK is output to request retransmission of a packet, the retransmission control unit 341 outputs retransmission information that indicates retransmission of the packet, to a retransmission information managing unit 345.

The resource allocating unit 342 allocates resources to the mobile station 120. The resource allocating unit 342 outputs to the encoding circuit 330, ACK and NACK output from the retransmission control unit 341. The resource allocating unit 342 outputs to the encoding circuit 330, a setting request signal output from the bundle number managing unit 348.

The mobile station control unit 343 provides the TTI bundle number control for each of the mobile stations 120. The TTI bundle number control by the control circuit 340 is provided, for example, on a medium-term basis (e.g., several tens of [ms] to several [s]). For example, the mobile station control unit 343 includes a CRC information managing unit 344, the retransmission information managing unit 345, a memory 346, and a mobile station bundle number determining unit 347. The CRC information managing unit 344 acquires and manages CRC information output from the encoding circuit 330. For example, the CRC information managing unit 344 stores the CRC information into the memory 346 and accumulates and outputs to the mobile station bundle number determining unit 347, the CRC result for each of the mobile stations 120 based on the CRC information stored in the memory 346.

The retransmission information managing unit 345 acquires and manages the retransmission information output from the retransmission control unit 341. For example, the retransmission information managing unit 345 stores the retransmission information into the memory 346 and accumulates and outputs to the mobile station bundle number determining unit 347, the retransmission number for each of the mobile stations 120 based on the retransmission information stored in the memory 346. The memory 346 stored the CRC information and the retransmission information for each of the mobile stations 120.

The mobile station bundle number determining unit 347 determines the TTI bundle number for each of the mobile stations 120 based on the CRC information from the CRC information managing unit 344 and the retransmission information from the retransmission information managing unit 345. The mobile station bundle number determining unit 347 uses a control signal output from the L2/L3 circuit 350 to set control parameters such as a threshold value and a determination period of a determining process of the TTI bundle number. The mobile station bundle number determining unit 347 outputs to the bundle number managing unit 348, TTI bundle number information that indicates the determined TTI bundle number for each of the mobile stations 120.

The bundle number managing unit 348 controls the TTI bundle number for each of the mobile stations 120 based on the TTI bundle number information output from the mobile station bundle number determining unit 347. For example, the bundle number managing unit 348 outputs to the resource allocating unit 342, a setting request signal for the object mobile station 120 of the setting of the TTI bundle number. The setting request signal includes the TTI bundle number that should be set by the object mobile station 120. As a result, the setting request signal is received by the object mobile station 120 and can cause the mobile station 120 to set the TTI bundle number.

The L2/L3 circuit 350 is a circuit disposed between the control circuit 340 and the upper-level interface 360 to execute communication processes of the L2 and L3 layers. The upper-level interface 360 is a communication interface communicating with an upper-level communication station (e.g., the upper-level communication stations 221 and 222) of the base station 110.

Figure 4:
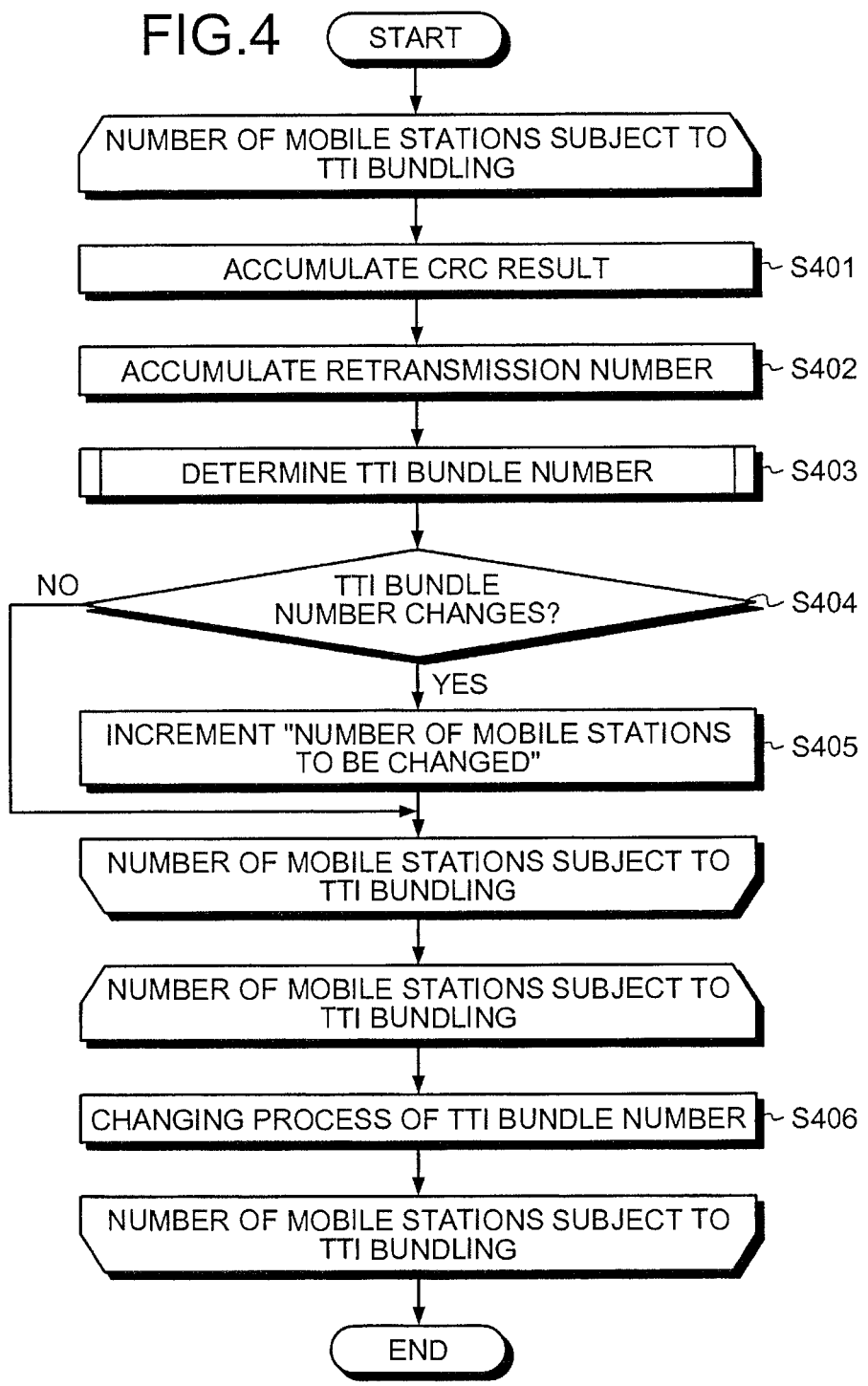
FIG. 4 is a flowchart of an example of TTI bundle number control according to the first embodiment.

FIG. 4 is a flowchart of an example of the TTI bundle number control according to the first embodiment. The control circuit 340 of the base station 110 depicted in FIG. 4 executes steps S401 to S405 for each of the object mobile stations 120 of the TTI bundling. First, the CRC information managing unit 344 accumulates the CRC result of an object mobile station based on the CRC information stored in the memory 346 (step S401). The retransmission information managing unit 345 accumulates the retransmission number of the object mobile station based on the retransmission information stored in the memory 346 (step S402).

The mobile station bundle number determining unit 347 determines the TTI bundle number of the object mobile station based on at least one of the CRC result accumulated at step S402 and the retransmission number accumulated at step S401 (step S403). The mobile station bundle number determining unit 347 determines whether the TTI bundle number of the object mobile station is changed, based on the determination result at step S403 (step S404).

If the TTI bundle number of the object mobile station is not changed at step S404 (step S404: NO), the control circuit 340 shifts the process to the next object mobile station of the TTI bundling. If the TTI bundle number of the object mobile station is changed (step S404: YES), the mobile station bundle number determining unit 347 increments the "number of mobile stations to be changed" (step S405). The "number of mobile stations to be changed" is information that indicates the number of the mobile stations 120 in which the TTI bundle number is changed, and is stored in the memory 346.

After executing steps S401 to S405 for each of the object mobile stations 120 of the TTI bundling, the control circuit 340 executes step S406 for each of the object mobile stations 120 having the TTI bundle number to be changed, i.e., the same number of times as the "number of mobile stations to be changed". At step S406, the bundle number managing unit 348 executes a changing process of the TTI bundle number for the object mobile station (step S406) and terminates the series of operations. For example, the bundle number managing unit 348 transmits to the object mobile station, the setting request signal including the TTI bundle number of the object mobile station determined at step S403 to execute the changing process.

Figure 5:
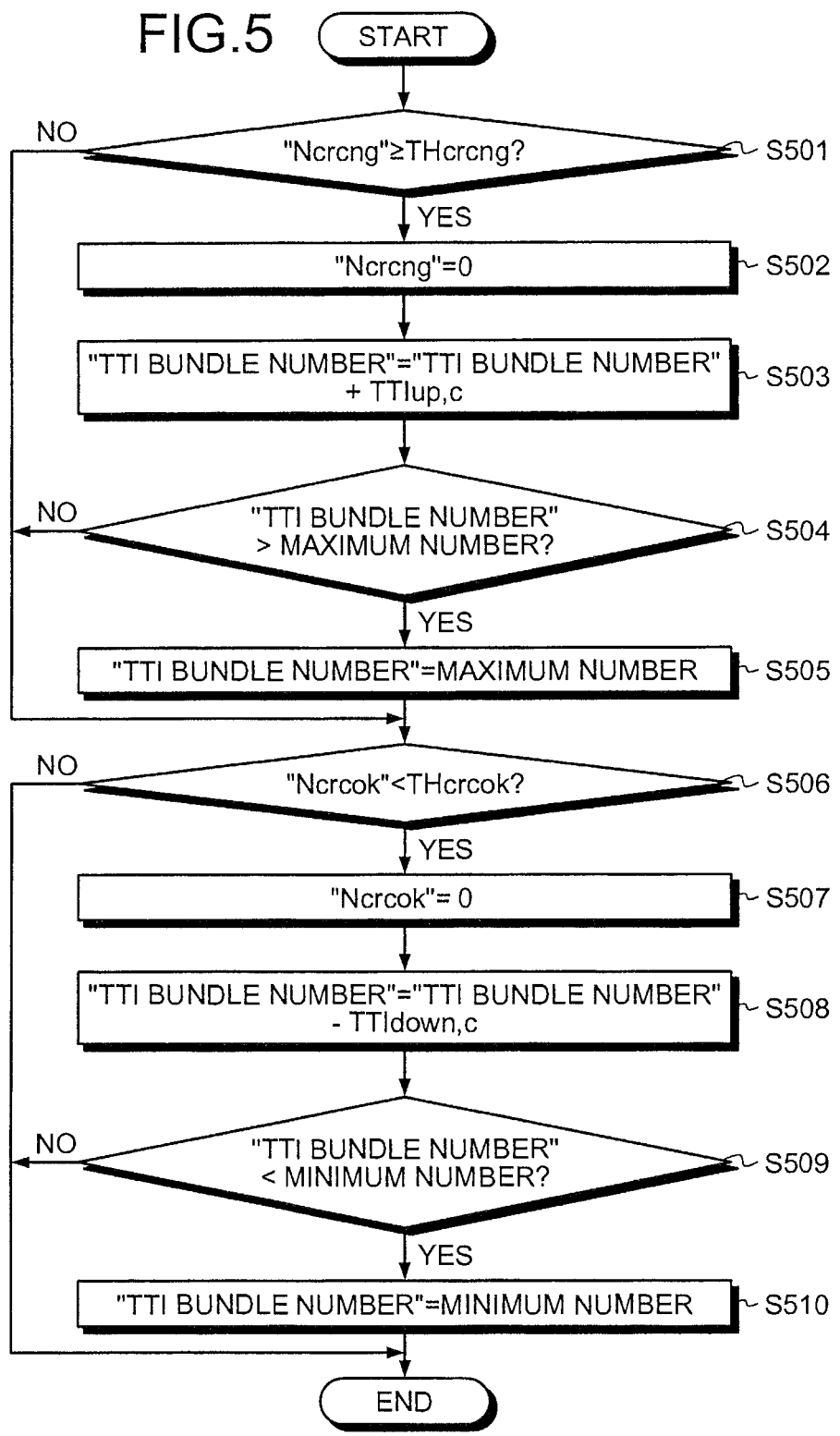
FIG. 5 is a flowchart of a first specific example of a determining process of the TTI bundle number on the basis of a mobile station.

FIG. 5 is a flowchart of a first specific example of the determining process of the TTI bundle number on the basis of a mobile station. The mobile station bundle number determining unit 347 executes, for example, a process depicted in FIG. 5 at step S403 depicted in FIG. 4 to determine the TTI bundle number related to an object mobile station. First, the mobile station bundle number determining unit 347 determines whether a "retransmission number" ("Ncrcng") is at least equal to a retransmission number threshold value (THcrcng) (step S501). The "retransmission number" is information that indicates the number of times that the retransmission operation of packets transmitted for the first time by the object mobile station occurs in succession and is stored in the memory 346, for example.

If the "retransmission number" is not greater than or equal to the retransmission number threshold value at step S501 (step S501: NO), the mobile station bundle number determining unit 347 proceeds to step S506. If the "retransmission number" is greater than or equal to the retransmission number threshold value (step S501: YES), the mobile station bundle number determining unit 347 sets the "retransmission number" to zero (step S502).

The mobile station bundle number determining unit 347 adds TTIup,c to a "TTI bundle number" (step S503). The "TTI bundle number" is information having the current TTI bundle number of the object mobile station as a default number and is stored in the memory 346, for example. TTIup,c is a unit of increase in the "TTI bundle number".

The mobile station bundle number determining unit 347 determines whether the "TTI bundle number" is larger than a predetermined maximum number of the "TTI bundle number" (step S504). If the "TTI bundle number" is not larger than the predetermined maximum number (step S504: NO), the mobile station bundle number determining unit 347 proceeds to step S506. If the "TTI bundle number" is larger than the predetermined maximum number (step S504: YES), the mobile station bundle number determining unit 347 sets the "TTI bundle number" to the predetermined maximum number (step S505). As a result, the "TTI bundle number" can be prevented from exceeding the predetermined maximum number.

The mobile station bundle number determining unit 347 determines whether an "OK number" ("Ncrcok") is smaller than an OK number threshold value (THcrcok) (step S506). The "OK number" is information that indicates the number of times that the CRC result of the first transmission of the object mobile station becomes OK within a TTI number smaller than the current "TTI bundle number" in succession and is stored in the memory 346, for example. If the "OK number" is not smaller than the OK number threshold value (step S506: NO), the mobile station bundle number determining unit 347 terminates the series of operations.

If the "OK number" is smaller than the OK number threshold value at step S506 (step S506: YES), the mobile station bundle number determining unit 347 sets the "OK number" to "0" (step S507). TTIdown,c is then subtracted from the "TTI bundle number" (step S508). TTIdown,c is a unit of decrease in the "TTI bundle number".

The mobile station bundle number determining unit 347 determines whether the "TTI bundle number" is smaller than a predetermined minimum number (step S509). If the "TTI bundle number" is not smaller than the predetermined minimum number (step S509: NO), the mobile station bundle number determining unit 347 terminates the series of operations. If the "TTI bundle number" is smaller than the predetermined minimum number (step S509: YES), the mobile station bundle number determining unit 347 sets the "TTI bundle number" to the predetermined minimum number (step S510). As a result, the "TTI bundle number" can be prevented from falling below the predetermined minimum number.

With steps S501 to S505, the base station 110 can cause the TTI bundle number of the object mobile station to be set based on the number of times that the retransmission operation of packets transmitted for the first time by the object mobile station occurs in succession. For example, the base station 110 can increase the TTI bundle number of the object mobile station if the retransmission operation of packets transmitted for the first time by the object mobile station occurs in succession for the number of times greater than or equal to the threshold value.

With steps S506 to S510, the base station 110 can cause the TTI bundle number of the object mobile station to be set based on the number of times that the CRC result of the packets from the object mobile station becomes OK (errorless) within a TTI number (transmission number) smaller than the current "TTI bundle number" in succession. For example, the base station 110 reduces the TTI bundle number of the object mobile station if the CRC result of packets from the object mobile station becomes OK within a TTI number smaller than the current "TTI bundle number" in succession for the number of times less than or equal to the threshold value.

Figure 6:
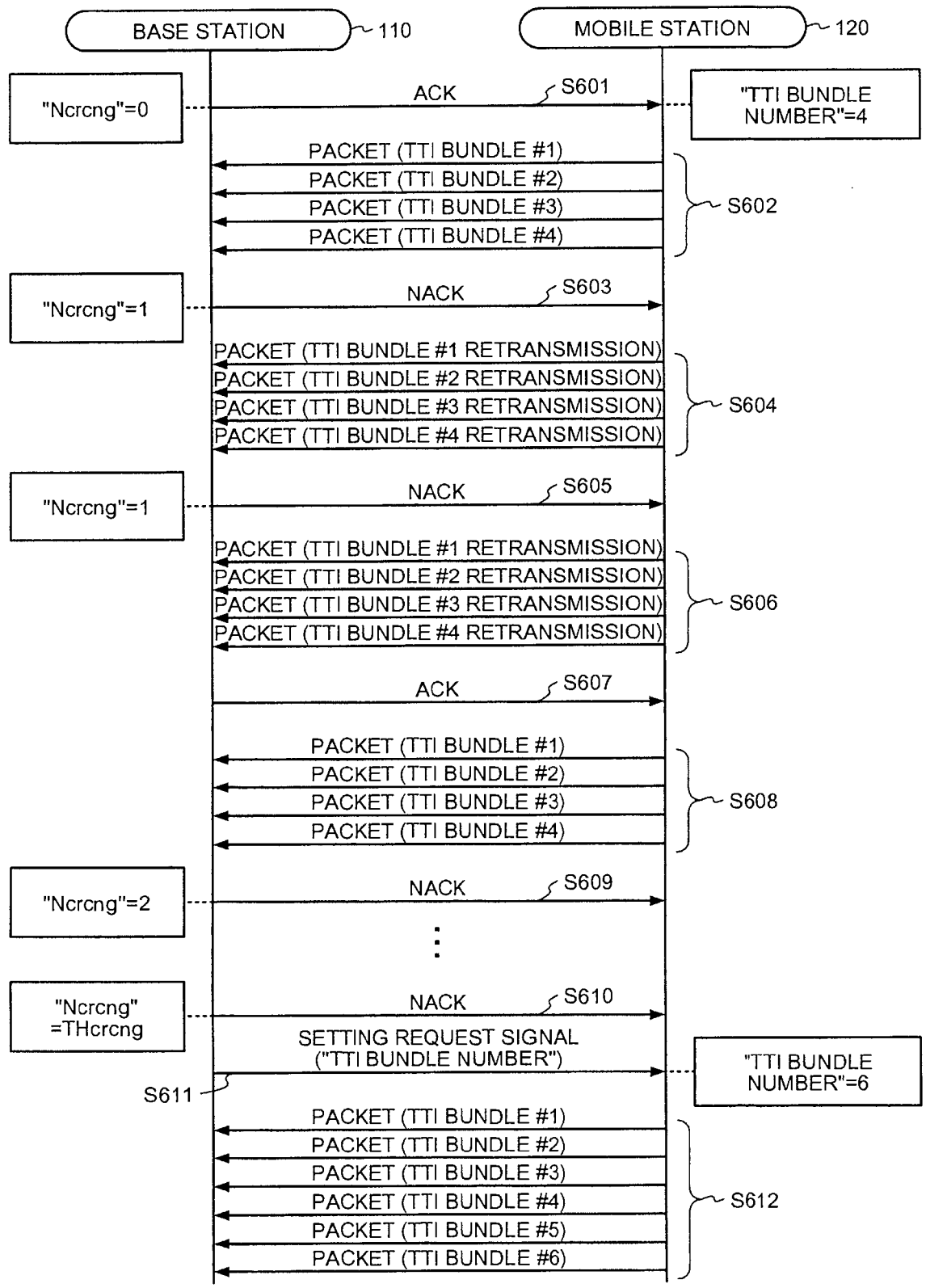
FIG. 6 is a diagram of a first operation example of the first specific example of the determining process of the TTI bundle number on the basis of a mobile station.

FIG. 6 is a diagram of a first operation example of the first specific example of the determining process of the TTI bundle number on the basis of a mobile station. In FIG. 6, description will be made of the operation in which the base station 110 increases the TTI bundle number of the mobile station 210 according to steps S501 to S505 depicted in FIG. 5. As depicted in FIG. 6, first, it is assumed that the base station 110 transmits to the mobile station 120, ACK for the last packets transmitted by the mobile station 120 (step S601). The "TTI bundle number" of the mobile station 120 is set to four at this point. It is assumed that the "retransmission number" of the base station 110 is zero.

The mobile station 120 continuously transmits packets for four continuous TTIs (TTI bundle #1 to #4) (step S602). It is assumed that the CRC result of the packets transmitted at step S602 is NG. Since the packets transmitted at step S602 are transmitted for the first time, the "retransmission number" of the base station 110 is incremented to one. The base station 110 transmits to the mobile station 120, NACK for the packets transmitted at step S602 (step S603).

The mobile station 120 continuously transmits the packets transmitted at step S601 again for four continuous TTIs (TTI bundle #1 retransmission to #4 retransmission) (step S604). It is assumed that the CRC result of the packets transmitted at step S604 is NG. Since the packets transmitted at step S604 are retransmitted, the "retransmission number" of the base station 110 is not incremented. The base station 110 transmits to the mobile station 120, NACK for the packets transmitted at step S604 (step S605).

The mobile station 120 continuously transmits the packets transmitted at step S601 again for four continuous TTIs (TTI bundle #1 retransmission to #4 retransmission) (step S606). It is assumed that the CRC result of the packets transmitted at step S606 is OK. Since the packets transmitted at step S606 are retransmitted, the "retransmission number" of the base station 110 is not incremented. The base station 110 transmits to the mobile station 120, ACK for the packets transmitted at step S606 (step S607).

The mobile station 120 continuously transmits new packets for four continuous TTIs (TTI bundle #1 to #4) (step S608). It is assumed that the CRC result of the packets transmitted at step S608 is NG. Since the packets transmitted at step S608 are transmitted for the first time, the "retransmission number" of the base station 110 is incremented to two. The base station 110 transmits to the mobile station 120, NACK for the packets transmitted at step S608 (step S609).

It is assumed that the operation as described above continues and makes the "retransmission number" of the base station 110 equal to the retransmission number threshold value. The base station 110 then transmits to the mobile station 120, NACK for the last packets transmitted from the base station 120 (step S610). The base station 110 transmits to the mobile station 120, a setting request signal including a "TTI bundle number" acquired by adding TTIup,c to the current "TTI bundle number" (step S611). Assuming that TTIup,c is two, the "TTI bundle number" included in the setting request signal is six.

In response, the mobile station 120 sets the "TTI bundle number" thereof to six. The mobile station 120 then continuously transmits packets for six continuous TTIs (TTI bundle #1 to #6) (step S612). As described above, if the retransmission operation of packets transmitted for the first time by the object mobile station occurs in succession for the number of times greater than or equal to the threshold value, the TTI bundle number of the mobile station 120 can be increased.

Figure 7:
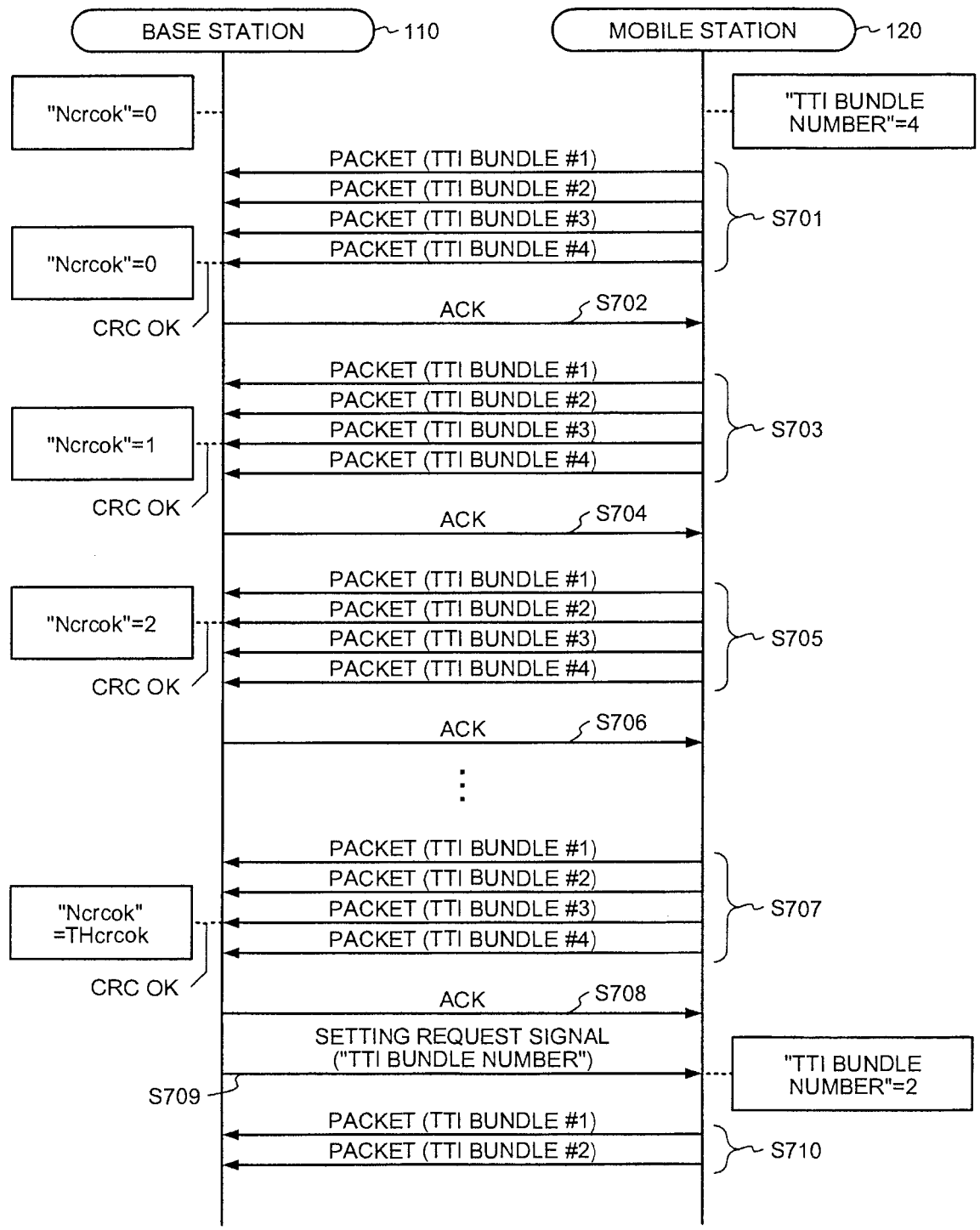
FIG. 7 is a diagram of a second operation example of the first specific example of the determining process of the TTI bundle number on the basis of a mobile station.

FIG. 7 is a diagram of a second operation example of the first specific example of the determining process of the TTI bundle number on the basis of a mobile station. In FIG. 7, description will be made of the operation in which the base station 110 reduces the TTI bundle number of the mobile station 210 according to steps S506 to S510 depicted in FIG. 5. As depicted in FIG. 7, it is assumed that the "TTI bundle number" of the mobile station 120 is set to four at the beginning. It is assumed that the "OK number" of the base station 110 is zero.

First, the mobile station 120 continuously transmits packets for four continuous TTIs (TTI bundle #1 to #4) (step S701). It is assumed that the CRC result of the packet of the fourth transmission (TTI bundle #4) becomes OK for the first time among the packets continuously transmitted at step S701. In this case, since the CRC result becomes OK when the number of times is the same as the "TTI bundle number" of four, the "OK number" of the base station 110 is still zero. The base station 110 transmits to the mobile station 120, ACK for the packets transmitted at step S701 (step S702).

The mobile station 120 continuously transmits new packets for four continuous TTIs (TTI bundle #1 to #4) (step S703). It is assumed that the CRC result of the packet of the third transmission (TTI bundle #3) becomes OK for the first time among the packets continuously transmitted at step S703. In this case, since the CRC result becomes OK when the number of times is smaller than the "TTI bundle number" of four, the "OK number" of the base station 110 is incremented to one. The base station 110 transmits to the mobile station 120, ACK for the packets transmitted at step S703 (step S704).

The mobile station 120 continuously transmits new packets for four continuous TTIs (TTI bundle #1 to #4) (step S705). It is assumed that the CRC result of the packet of the second transmission (TTI bundle #2) becomes OK for the first time among the packets continuously transmitted at step S705. In this case, since the CRC result becomes OK when the number of times is smaller than the "TTI bundle number" of four, the "OK number" of the base station 110 is incremented to two. The base station 110 transmits to the mobile station 120, ACK for the packets transmitted at step S705 (step S706).

It is assumed that after the operation as described above continues and that the mobile station 120 continuously transmits new packets for four continuous TTIs (TTI bundle #1 to #4) (step S707). It is assumed that the CRC result of the packet of the third transmission (TTI bundle #3) becomes OK for the first time among the packets continuously transmitted at step S707. In this case, since the CRC result becomes OK when the number of times is smaller than the "TTI bundle number" of four, the "OK number" of the base station 110 is incremented.

It is assumed that the "OK number" of the base station 110 reaches the OK number threshold value at this point. The base station 110 transmits to the mobile station 120, ACK for the packets transmitted at step S707 (step S708). The base station 110 transmits to the mobile station 120, a setting request signal including a "TTI bundle number" acquired by subtracting TTIdown,c from the current "TTI bundle number" (step S709). Assuming that TTIdown,c is two, the "TTI bundle number" included in the setting request signal is two.

In response, the mobile station 120 changes the "TTI bundle number" thereof to two. The mobile station 120 then continuously transmits packets for two continuous TTIs (TTI bundle #1, #2) (step S710). As described above, if the CRC result becomes OK (error-less) within a TTI number smaller than the current "TTI bundle number" in succession for the number of times greater than or equal to the threshold value, the TTI bundle number of the mobile station 120 can be reduced.

According to the first specific example of the determining process of the TTI bundle number on the basis of a mobile station depicted in FIGS. 5 to 7, the "TTI bundle number" can be optimized by determining whether the current "TTI bundle number" is appropriate, based on the retransmission number. When retransmission occurs in succession, it is believed that the "TTI bundle number" is insufficient for a situation of communication channels (necessary reception quality is not satisfied) and therefore, the "TTI bundle number" is increased to achieve improvement in reception quality.

On the other hand, if the CRC result becomes OK within TTIs less than the current "TTI bundle number" in succession, it is believed that resources are excessively utilized and therefore, the "TTI bundle number" can be reduced to improve the resource utilization efficiency. The first specific example of the determining process of the TTI bundle number on the basis of a mobile station depicted in FIGS. 5 to 7 can reduce an error promptly (e.g., in about several tens of [ms]) particularly when a large error exists between the current "TTI bundle number" and the actually necessary TTI bundle number.

Figure 8:
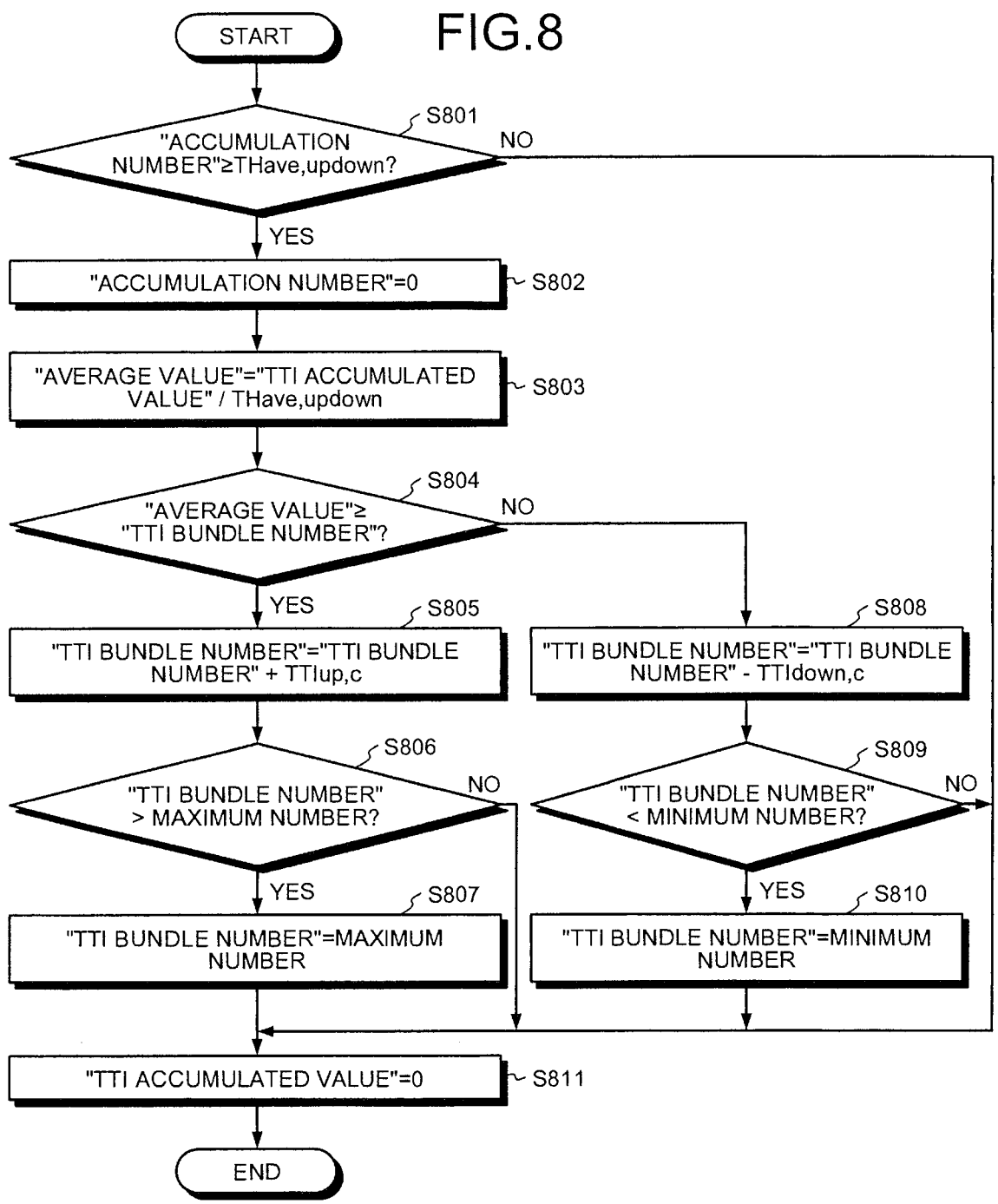
FIG. 8 is a flowchart of a second specific example of the determining process of the TTI bundle number on the basis of a mobile station.

FIG. 8 is a flowchart of a second specific example of the determining process of the TTI bundle number on the basis of a mobile station. The mobile station bundle number determining unit 347 may execute, for example, a process depicted in FIG. 8 at step S403 depicted in FIG. 4 to determine the TTI bundle number related to an object mobile station. First, the mobile station bundle number determining unit 347 determines whether an "accumulation number" is at least equal to an accumulation number threshold value (THave,updown) (step S801).

The "accumulation number" is information that indicates how many times a "TTI accumulated value" is accumulated, and is stored in the memory 346, for example. The "TTI accumulated value" is information that indicates an accumulated value of the TTI number until the CRC result becomes OK in the packet transmissions including the first transmission and retransmissions, and is stored in the memory 346, for example.

At step S801, if the "accumulation number" is not greater than or equal to the accumulation number threshold value (step S801: NO), the mobile station bundle number determining unit 347 proceeds to step S811. If the "accumulation number" is greater than or equal to the accumulation number threshold value (step S801: YES), the mobile station bundle number determining unit 347 sets the "accumulation number" to zero (step S802). The mobile station bundle number determining unit 347 divides the "TTI accumulated value" by the accumulation number threshold value to calculate an "average value" of the "TTI accumulated value" (step S803).

The mobile station bundle number determining unit 347 determines whether the "average value" calculated at step S803 is at least equal to the "TTI bundle number" (step S804). If the average value of the "TTI accumulated value" is greater than or equal to the "TTI bundle number" (step S804: YES), the mobile station bundle number determining unit 347 adds TTIup,c to the "TTI bundle number" (step S805). The mobile station bundle number determining unit 347 determines whether the "TTI bundle number" is greater than a predetermined maximum number (step S806).

If the "TTI bundle number" is not greater than the predetermined maximum number at step S806 (step S806: NO), the mobile station bundle number determining unit 347 proceeds to step S811. If the "TTI bundle number" is greater than the predetermined maximum number (step S806: YES), the mobile station bundle number determining unit 347 sets the "TTI bundle number" to the predetermined maximum number (step S807) and proceeds to step S811. As a result, the "TTI bundle number" can be prevented from exceeding the predetermined maximum number.

If the average value of the "TTI accumulated value" is not greater than or equal to the "TTI bundle number" at step S804 (step S804: NO), the mobile station bundle number determining unit 347 subtracts TTIdown,c from the "TTI bundle number" (step S808). The mobile station bundle number determining unit 347 determines whether the "TTI bundle number" is smaller than a predetermined minimum number (step S809).

If the "TTI bundle number" is not smaller than the predetermined minimum number at step S809 (step S809: NO), the mobile station bundle number determining unit 347 proceeds to step S811. If the "TTI bundle number" is smaller than the predetermined minimum number (step S809: YES), the mobile station bundle number determining unit 347 sets the "TTI bundle number" to the predetermined minimum number (step S810) and proceeds to step S811. As a result, the "TTI bundle number" can be prevented from falling below the predetermined minimum number. The mobile station bundle number determining unit 347 sets the "TTI accumulated value" to zero (step S811) and terminates the series of operations.

The process depicted in FIG. 8 enables the base station 110 to cause the "TTI bundle number" of the object mobile station to be set based on TTIs (transmission numbers) until a packet from the object mobile station becomes error-free. For example, the base station 110 accumulates TTIs until no error is detected in the error detection of packets from the object mobile station, for a predetermined number of times (accumulation number threshold value). The base station 110 causes the "TTI bundle number" of the object mobile station to be set based on the average value of the accumulated TTIs.

For example, the base station 110 increases the "TTI bundle number" of the object mobile station if the average value of TTIs is larger than the current "TTI bundle number" of the object mobile station. The base station 110 reduces the "TTI bundle number" of the object mobile station if the average value of TTIs is less than the current "TTI bundle number" of the object mobile station.

Figure 9:
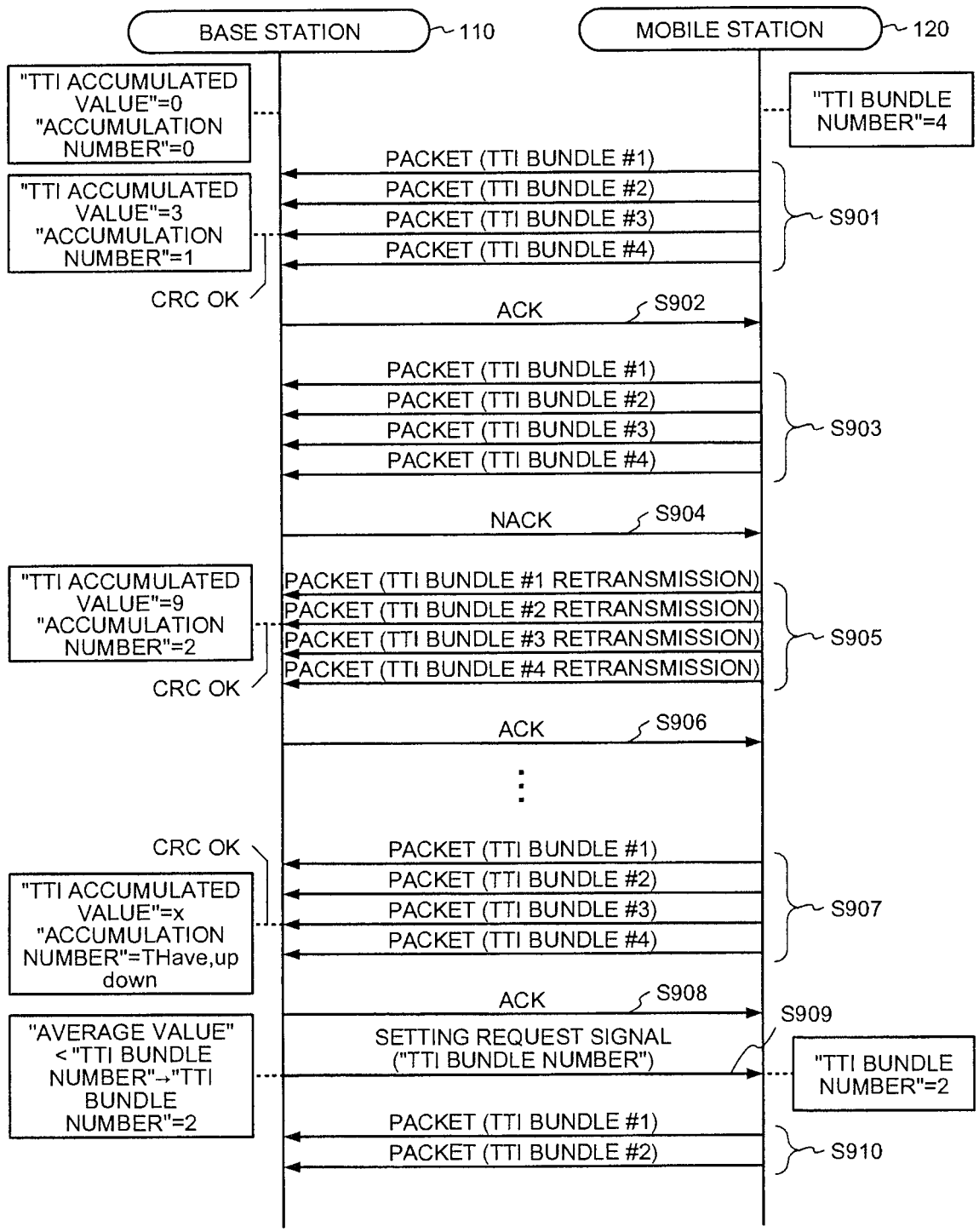
FIG. 9 is a diagram of an operation example of the second specific example of the determining process of the TTI bundle number on the basis of a mobile station.

FIG. 9 is a diagram of an operation example of the second specific example of the determining process of the TTI bundle number on the basis of a mobile station. As depicted in FIG. 9, it is assumed that the "TTI bundle number" of the mobile station 120 is set to four at the beginning. It is assumed that the "TTI accumulated value" and the "accumulation number" of the base station 110 are zero.

First, the mobile station 120 continuously transmits packets for four continuous TTIs (TTI bundle #1 to #4) (step S901). It is assumed that the CRC result of the packet of the third transmission (TTI bundle #3) becomes OK for the first time among the packets continuously transmitted at step S901. In this case, the "TTI accumulated value" of the base station 110 is three. The "accumulation number" of the base station 110 is incremented to one. The base station 110 transmits to the mobile station 120, ACK for the packets transmitted at step S901 (step S902).

The mobile station 120 continuously transmits new packets for four continuous TTIs (TTI bundle #1 to #4) (step S903). It is assumed that the CRC results of all the packets continuously transmitted at step S903 are NG. In this case, the "TTI accumulated value" of the base station 110 is still three. The "accumulation number" of the base station 110 is still one. The base station 110 transmits to the mobile station 120, NACK for the packets transmitted at step S903 (step S904).

The mobile station 120 continuously transmits the packets transmitted at step S903 again for four continuous TTIs (TTI bundle #1 to #4 retransmission) (step S905). It is assumed that the CRC result of the packet of the second transmission (TTI bundle #2 retransmission) becomes OK for the first time, among the packets continuously transmitted at step S905. In this case, since the CRC result of the sixth transmission becomes OK among the packet transmissions of steps S903 and S905, the "TTI accumulated value" of the base station 110 is 3+6=9. The "accumulation number" of the base station 110 is incremented to two. The base station 110 transmits to the mobile station 120, ACK for the packets transmitted at step S905 (step S906).

It is assumed that the operation as described above continues and that the mobile station 120 continuously transmits new packets for four continuous TTIs (TTI bundle #1 to #4) (step S907). It is assumed that the CRC result of the packet of the third transmission (TTI bundle #3) becomes OK for the first time among the packets continuously transmitted at step S907. It is assumed that the "accumulation number" of the base station 110 reaches the accumulation number threshold value at this point. It is assumed that the "TTI accumulated value" of the base station 110 is x.

The base station 110 transmits to the mobile station 120, ACK for the packets transmitted at step S907 (step S908). The base station 110 compares the "average value" with the current "TTI bundle number" and transmits to the mobile station 120, a setting request signal including a "TTI bundle number" determined based on the comparison result (step S909). If the average value of the "TTI accumulated value" is smaller than the current "TTI bundle number" and TTIdown,c is two, the "TTI bundle number" included in the setting request signal is two.

In response, the mobile station 120 changes the "TTI bundle number" thereof to two. The mobile station 120 then continuously transmits packets for two continuous TTIs (TTI bundle #1, #2) (step S910). As described above, if the "average value" is smaller than the current "TTI bundle number" of the object mobile station, the "TTI bundle number" of the object mobile station can be reduced. If the "average value" is larger than the current "TTI bundle number" of the object mobile station, the "TTI bundle number" of the object mobile station may be increased.

The "TTI bundle number" of the object mobile station may be reduced or increased only when an error between the "average value" and the current "TTI bundle number" of the object mobile station exceeds a certain value (e.g., 0.5). For example, if the "average value" is 4.4 and the current "TTI bundle number" of the object mobile station is 4, the "TTI bundle number" of the object mobile station is not changed.

According to the second specific example of the determining process of the TTI bundle number on the basis of a mobile station depicted in FIGS. 8 and 9, the "TTI bundle number" can be optimized by determining whether the current "TTI bundle number" of the object mobile station is appropriate, based on the average TTI number until the CRC result becomes OK. As a result, the reception characteristics of the object mobile station can be observed on a medium-term basis (e.g., in a period of about several hundred [ms]) to predict and follow the "TTI bundle number" necessary for transmission without retransmission. This enables the provision of the TTI bundle number control with higher accuracy.

Figure 10:
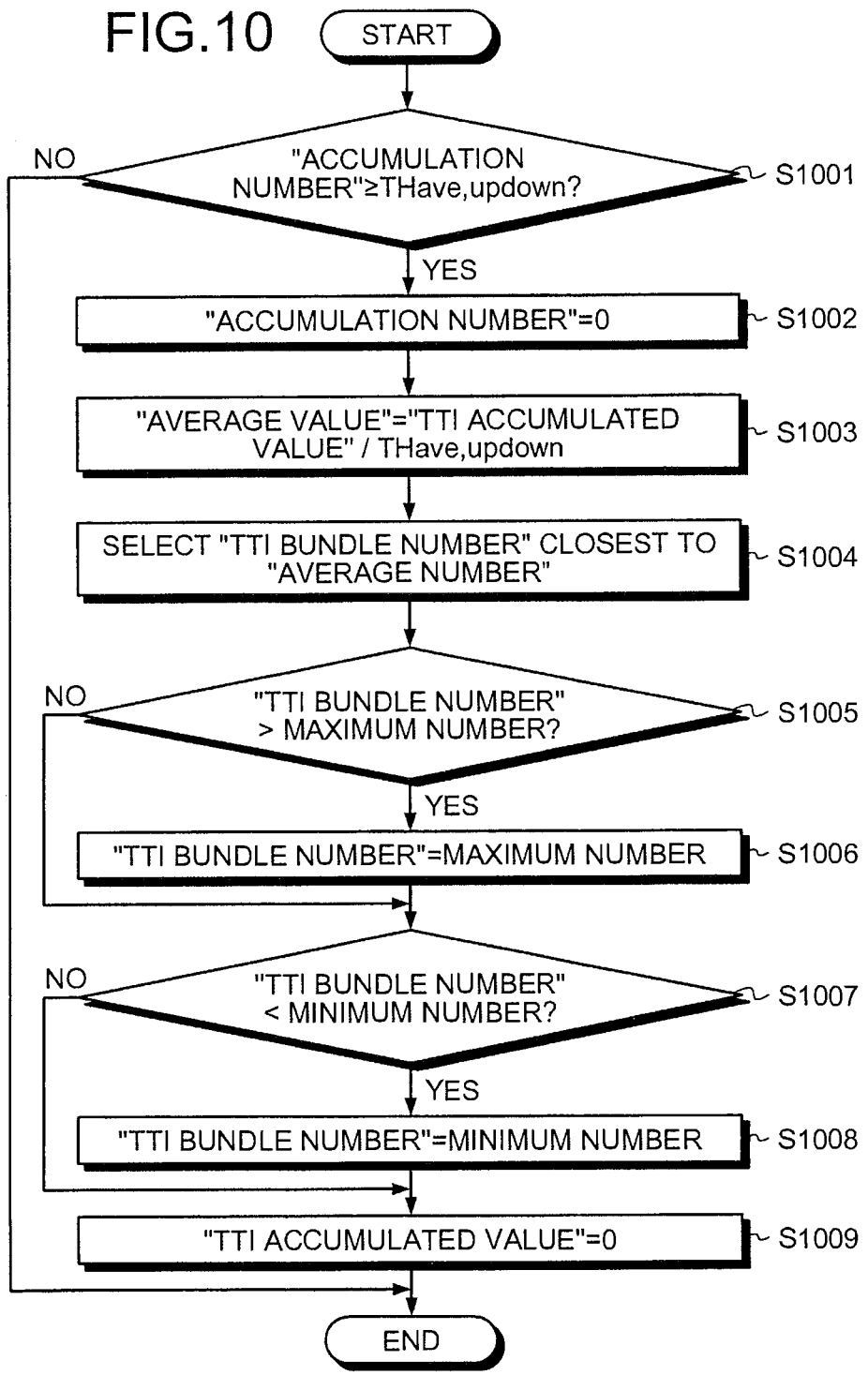
FIG. 10 is a flowchart of a third specific example of the determining process of the TTI bundle number on the basis of a mobile station.

FIG. 10 is a flowchart of a third specific example of the determining process of the TTI bundle number on the basis of a mobile station. The mobile station bundle number determining unit 347 may execute, for example, a process depicted in FIG. 10 at step S403 depicted in FIG. 4 to determine the TTI bundle number related to an object mobile station. Steps S1001 to S1003 depicted in FIG. 10 are the same as steps S801 to S803 depicted in FIG. 8.

After step S1003, the mobile station bundle number determining unit 347 selects the "TTI bundle number" closest to the "average number" calculated at step S1003 (step S1004). For example, the mobile station bundle number determining unit 347 selects an integer closest to the "average number" as the "TTI bundle number". The mobile station bundle number determining unit 347 determines whether the "TTI bundle number" is greater than a predetermined maximum number (step S1005).

If the "TTI bundle number" is not greater than the predetermined maximum number at step S1005 (step S1005: NO), the mobile station bundle number determining unit 347 proceeds to step S1007. If the "TTI bundle number" is greater than the predetermined maximum number (step S1005: YES), the "TTI bundle number" is set to the predetermined maximum number (step S1006). As a result, the "TTI bundle number" can be prevented from exceeding the predetermined maximum number. The mobile station bundle number determining unit 347 then determines whether the "TTI bundle number" is smaller than a predetermined minimum number (step S1007).

If the "TTI bundle number" is not smaller than the predetermined minimum number at step S1007 (step S1007: NO), the mobile station bundle number determining unit 347 proceeds to step S1009. If the "TTI bundle number" is smaller than the predetermined minimum number (step S10047: YES), the mobile station bundle number determining unit 347 sets the "TTI bundle number" to the predetermined minimum number (step S1008). As a result, the "TTI bundle number" can be prevented from falling below the predetermined minimum number. The mobile station bundle number determining unit 347 sets the "TTI accumulated value" to zero (step S1009) and terminates the series of operations.

The process depicted in FIG. 10 enables the base station 110 to select a number closest to the "average value" and cause the "TTI bundle number" of the object mobile station to be set to the selected number. As a result, the base station 110 can increase the "TTI bundle number" of the object mobile station if the "average value" is larger than the current "TTI bundle number" of the object mobile station. The base station 110 can reduce the "TTI bundle number" of the object mobile station if the "average value" is smaller than the current "TTI bundle number" of the object mobile station.

Figure 11:
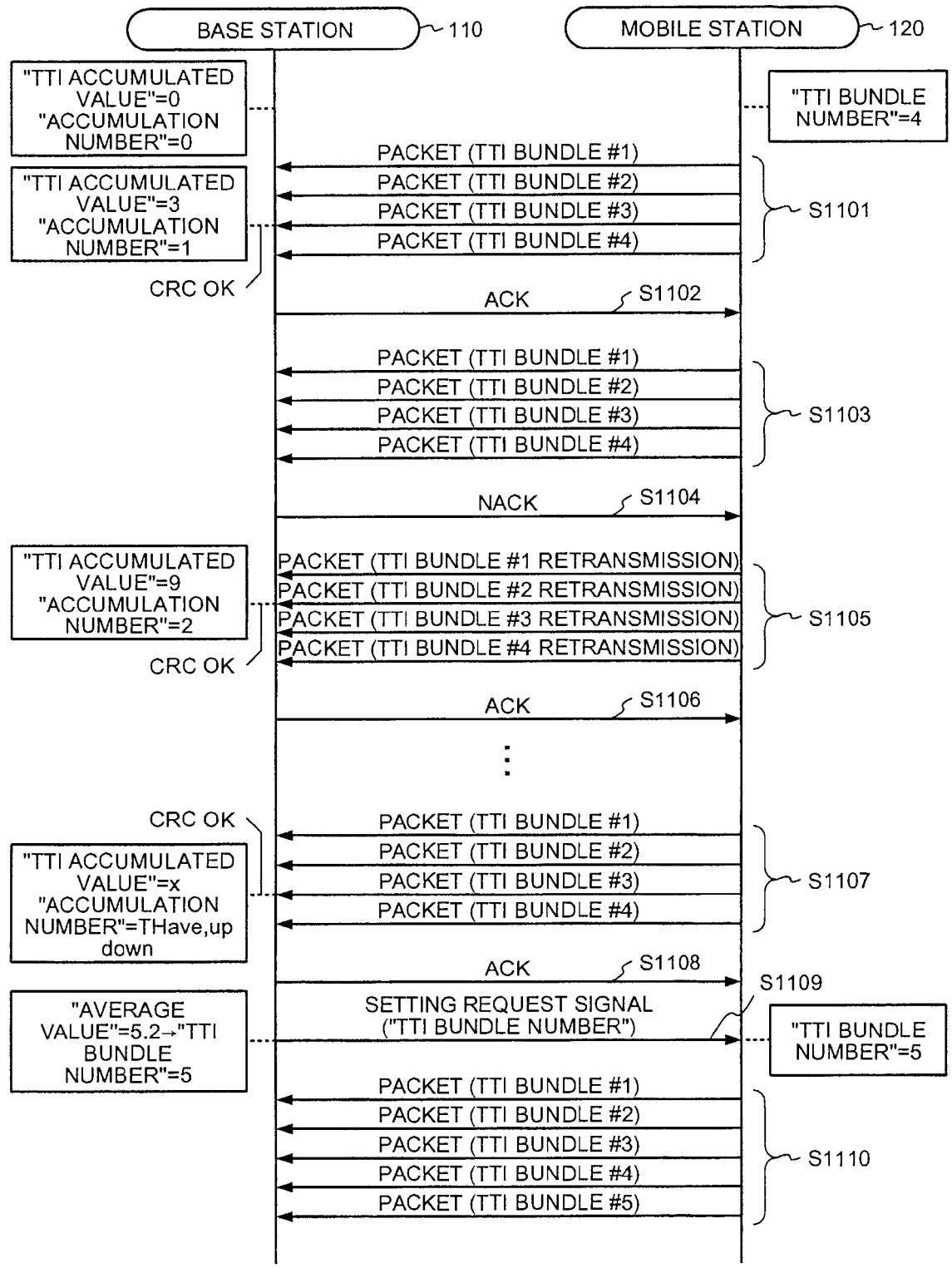
FIG. 11 is a diagram of an operation example of the third specific example of the determining process of the TTI bundle number on the basis of a mobile station.

FIG. 11 is a diagram of an operation example of the third specific example of the determining process of the TTI bundle number on the basis of a mobile station. Steps S1101 to S1108 depicted in FIG. 11 are the same as steps S901 to S908 depicted in FIG. 9. After step S1108, the base station 110 calculates the "average value" of the "TTI accumulated value" and transmits to the mobile station 120, a setting request signal including a "TTI bundle number" closest to the calculated "average value" (step S1109).

Assuming that the "average value" of the "TTI accumulated value" is 5.2, the "TTI bundle number" included in the setting request signal is five, which is the integer closest to 5.2. In response, the mobile station 120 changes the "TTI bundle number" thereof to five. The mobile station 120 then continuously transmits packets for five continuous TTIs (TTI bundle #1 to #5) (step S1110). Alternatively, if the "average value" of the "TTI accumulated value" is 5.8, the "TTI bundle number" included in the setting request signal is six, which is the integer closest to 5.8.

According to the third specific example of the determining process of the TTI bundle number on the basis of a mobile station depicted in FIGS. 10 and 11, the "TTI bundle number" can be optimized by determining whether the current "TTI bundle number" is appropriate, based on the average TTI number until the CRC result becomes OK. The "TTI bundle number" can be changed to the value closest to the measured "average value". As a result, since the control can be provided based on the latest "average value" regardless of the current "TTI bundle number", an environment with a faster-changing situation of communication channels can instantaneously be followed.

Figure 12:
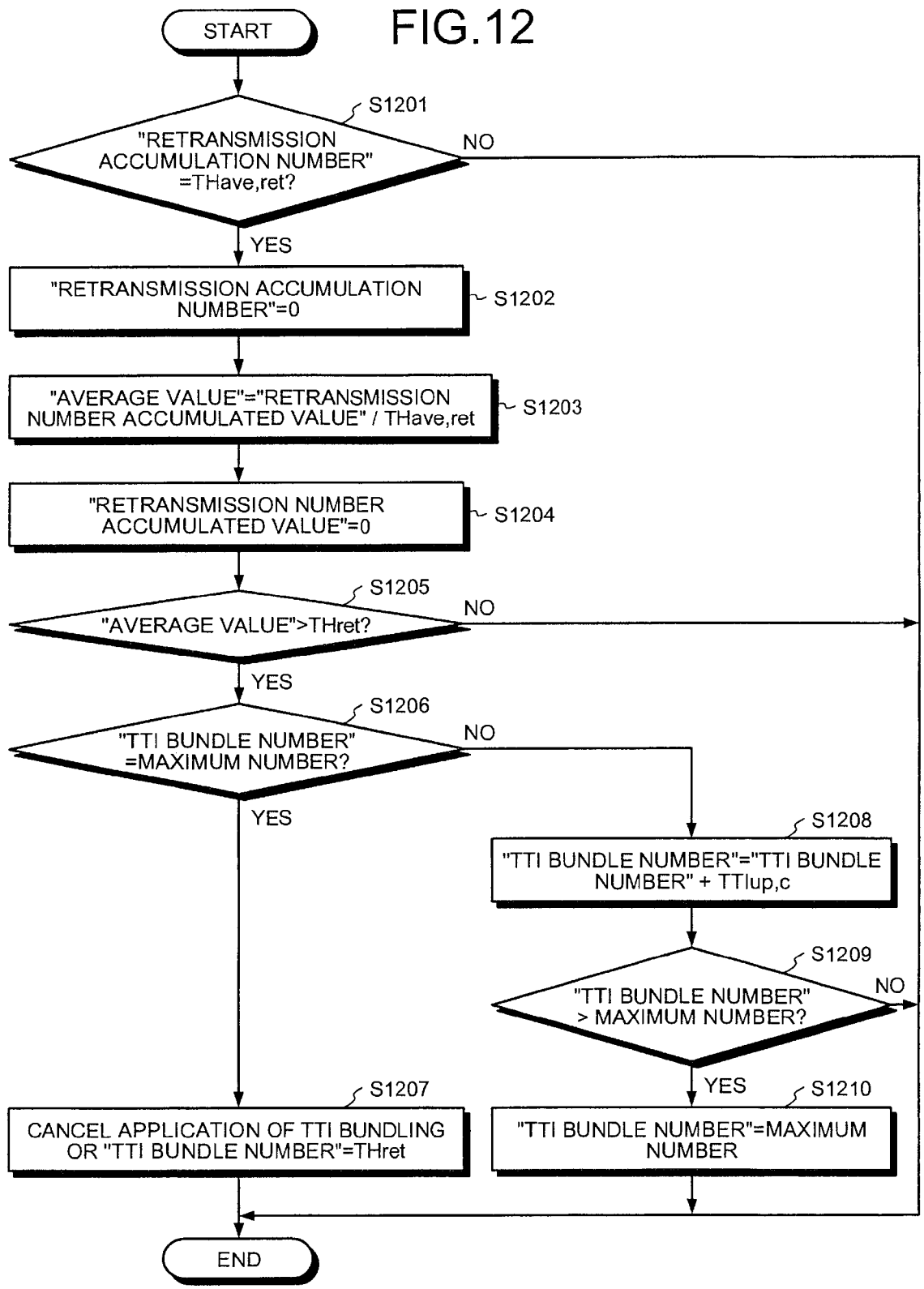
FIG. 12 is a flowchart of a fourth specific example of the determining process of the TTI bundle number on the basis of a mobile station.

FIG. 12 is a flowchart of a fourth specific example of the determining process of the TTI bundle number on the basis of a mobile station. The mobile station bundle number determining unit 347 may execute, for example, a process depicted in FIG. 12 at step S403 depicted in FIG. 4 to determine the TTI bundle number related to an object mobile station. First, the mobile station bundle number determining unit 347 determines whether a "retransmission accumulation number" reaches an accumulation number threshold value (THave,ret) (step S1201).

The "retransmission accumulation number" is information that indicates how many times a "retransmission number accumulated value" is accumulated, and is stored in the memory 346, for example. The "retransmission number accumulated value" is information that indicates an accumulated value of the retransmission number until the CRC result becomes OK in the packet transmissions including the first transmission and retransmissions, and is stored in the memory 346, for example.

At step S1201, if the "retransmission accumulation number" does not reach the accumulation number threshold value (step S1201: NO), the mobile station bundle number determining unit 347 terminates the series of operations. If the "retransmission accumulation number" reaches the accumulation number threshold value (step S1201: YES), the mobile station bundle number determining unit 347 sets the "retransmission accumulation number" to zero (step S1202).

The mobile station bundle number determining unit 347 divides the "retransmission number accumulated value" by the accumulation number threshold value to calculate an "average value" of the "retransmission number" (step S1203). The mobile station bundle number determining unit 347 sets the "retransmission number accumulated value" to zero (step S1204).

The mobile station bundle number determining unit 347 determines whether the "average value" calculated at step S1203 is greater than an average-value threshold value (THret) (step S1205). If the "average value" is not greater than the average-value threshold value (step S1205: NO), the mobile station bundle number determining unit 347 terminates the series of operations.

If the "average value" is greater than the average-value threshold value at step S1205 (step S1205: YES), the mobile station bundle number determining unit 347 determines whether the "TTI bundle number" is equal to a predetermined maximum number (step S1206). If the "TTI bundle number" is equal to the predetermined maximum number (step S1206: YES), the mobile station bundle number determining unit 347 cancels the application of the TTI bundling to the object mobile station (step S1207) and terminates the series of operations. Alternatively, at step S1207, the mobile station bundle number determining unit 347 may determine the "TTI bundle number" of the object mobile station as the average-value threshold value.

If the "TTI bundle number" is not equal to the predetermined maximum number at step S1206 (step S1206: NO), the mobile station bundle number determining unit 347 adds TTIup,c to the "TTI bundle number" (step S1208). The mobile station bundle number determining unit 347 then determines whether the "TTI bundle number" is greater than the predetermined maximum number (step S1209). If the "TTI bundle number" is not greater than the predetermined maximum number (step S1209: NO), the mobile station bundle number determining unit 347 terminates the series of operations.

If the "TTI bundle number" is greater than the predetermined maximum number (step S1209: YES), the mobile station bundle number determining unit 347 sets the "TTI bundle number" to the predetermined maximum number (step S1210) and terminates the series of operations.

The process depicted in FIG. 12 enables the base station 110 to cause the "TTI bundle number" of the object mobile station to be set based on the accumulated value of the retransmission number of packets from the object mobile station. For example, the base station 110 accumulates the accumulated value of the retransmission number of packets from the object mobile station for a predetermined number of times (accumulation number threshold value). The base station 110 causes the "TTI bundle number" of the object mobile station to be set based on the average value of the accumulated retransmission number.

Figure 13:
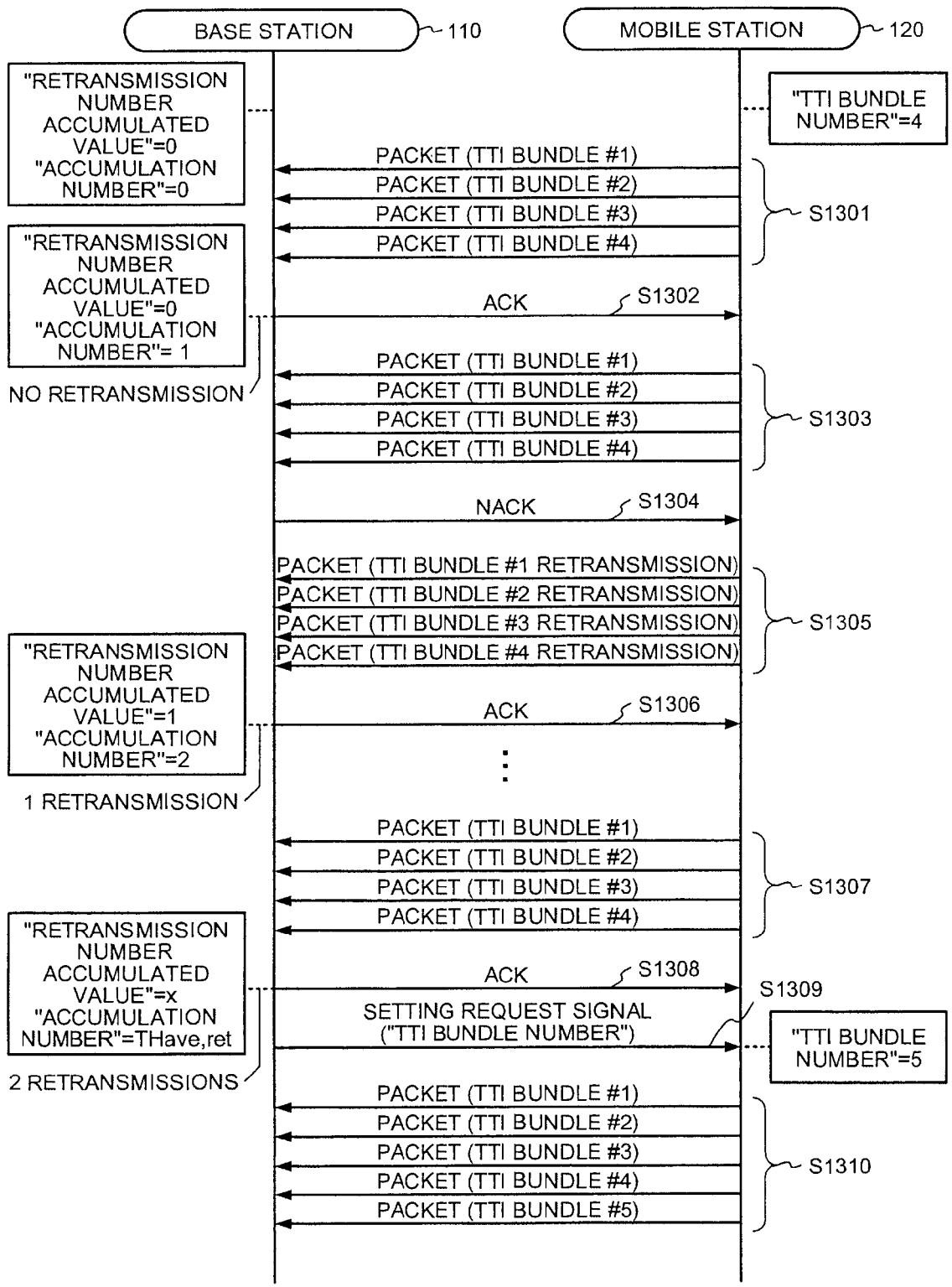
FIG. 13 is a diagram of an operation example of the fourth specific example of the determining process of the TTI bundle number on the basis of a mobile station.

FIG. 13 is a diagram of an operation example of the fourth specific example of the determining process of the TTI bundle number on the basis of a mobile station. As depicted in FIG. 13, it is assumed that the "TTI bundle number" of the mobile station 120 is set to four at the beginning. It is assumed that the "retransmission number accumulated value" and the "accumulation number" of the base station 110 are zero.

First, the mobile station 120 continuously transmits packets for four continuous TTIs (TTI bundle #1 to #4) (step S1301). It is assumed that the CRC result of the packets continuously transmitted at step S1301 is OK. In this case, since the CRC result becomes OK without retransmission, the "retransmission number accumulated value" of the base station 110 is still zero. The "accumulation number" of the base station 110 is incremented to one. The base station 110 transmits to the mobile station 120, ACK for the packets transmitted at step S1301 (step S1302).

The mobile station 120 continuously transmits new packets for four continuous TTIs (TTI bundle #1 to #4) (step S1303). It is assumed that the CRC result of the packets continuously transmitted at step S1302 is NG. The base station 110 transmits to the mobile station 120, NACK for the packets transmitted at step S1303 (step S1304).

The mobile station 120 continuously transmits the packets transmitted at step S1301 again for four continuous TTIs (TTI bundle #1 to #4 retransmission) (step S1305). It is assumed that the CRC result of the packets continuously transmitted at step S1305 is OK. In this case, since the CRC result becomes OK with one retransmission, the "retransmission number accumulated value" of the base station 110 changes to one. The "accumulation number" of the base station 110 is incremented to two. The base station 110 transmits to the mobile station 120, ACK for the packets transmitted at step S1305 (step S1306).

It is assumed that the operation as described above continues and that the mobile station 120 continuously transmits new packets for four continuous TTIs (TTI bundle #1 to #4) (step S1307). It is assumed that the CRC result of the packets continuously transmitted at step S1307 is OK. It is assumed that the "accumulation number" of the base station 110 reaches the accumulation number threshold value at this point. It is assumed that the "retransmission number accumulated value" of the base station 110 is x.

The base station 110 transmits to the mobile station 120, ACK for the packets transmitted at step S1307 (step S1308). The base station 110 compares the "average value" of the "retransmission number accumulated value" with the accumulation number threshold value and transmits to the mobile station 120, a setting request signal including a "TTI bundle number" determined based on the comparison result (step S1309). If the average value of the "retransmission number accumulated value" is greater than the accumulation number threshold value and TTIup,c is one, the "TTI bundle number" included in the setting request signal is five.

In response, the mobile station 120 changes the "TTI bundle number" thereof to five. The mobile station 120 then continuously transmits packets for five continuous TTIs (TTI bundle #1 to #5) (step S1310).

According to the fourth specific example of the determining process of the TTI bundle number on the basis of a mobile station depicted in FIGS. 12 and 13, the control of increasing the "TTI bundle number" can be provided based on the "average value" of the retransmission number measured on a medium-term basis (e.g., in a period of about several hundred [ms]), for example. If the "average value" of the retransmission number exceeds the average-value threshold value (in the case of exceeding the allowable retransmission number), the "TTI bundle number" can be increased to suppress the retransmission number within an allowable range.

However, if the allowable retransmission number cannot be realized even when the "TTI bundle number" is increased to a predetermined maximum number (the effect of increasing the "TTI bundle number" is small because of a poor communication channel state), the application of the TTI bundling can be canceled. Alternatively, a process is executed to make the "TTI bundle number" temporarily lower than the predetermined maximum number. As a result, in the case of an environment in which the application of the TTI bundling has no merit, an improvement in the communication channel state can be awaited or the application of the TTI bundling can be cancelled.

As described above, according to the communication system 100 of the first embodiment, the mobile station 120 performing the TTI bundling can be caused to set the TTI bundle number based on the reception quality of packets from the mobile station 120. As a result, the TTI bundling number suitable for a communication environment can dynamically be set to improve the communication efficiency. The TTI bundle number control can be provided to each of the mobile stations 120 to prevent each of the mobile stations 120 from ensuring excessive resources and improve the resource utilization efficiency. The frequencies of transmission suspension and retransmission due to contention for resources can be decreased to reduce system delay.

The communication system 100 according to the second embodiment is the same as the communication system 100 depicted in FIG. 1. An application example of the communication system 100 according to the second embodiment is the same as the communication system 200 depicted in FIG. 2. However, the base station 110 according to the second embodiment sets a "TTI bundle number" (predetermined number) of the mobile station 120 based on the frequency of transmission suspension of packets of the mobile station 120, the number of connections of the mobile stations 120 to the base station 110, etc.

Figure 14:
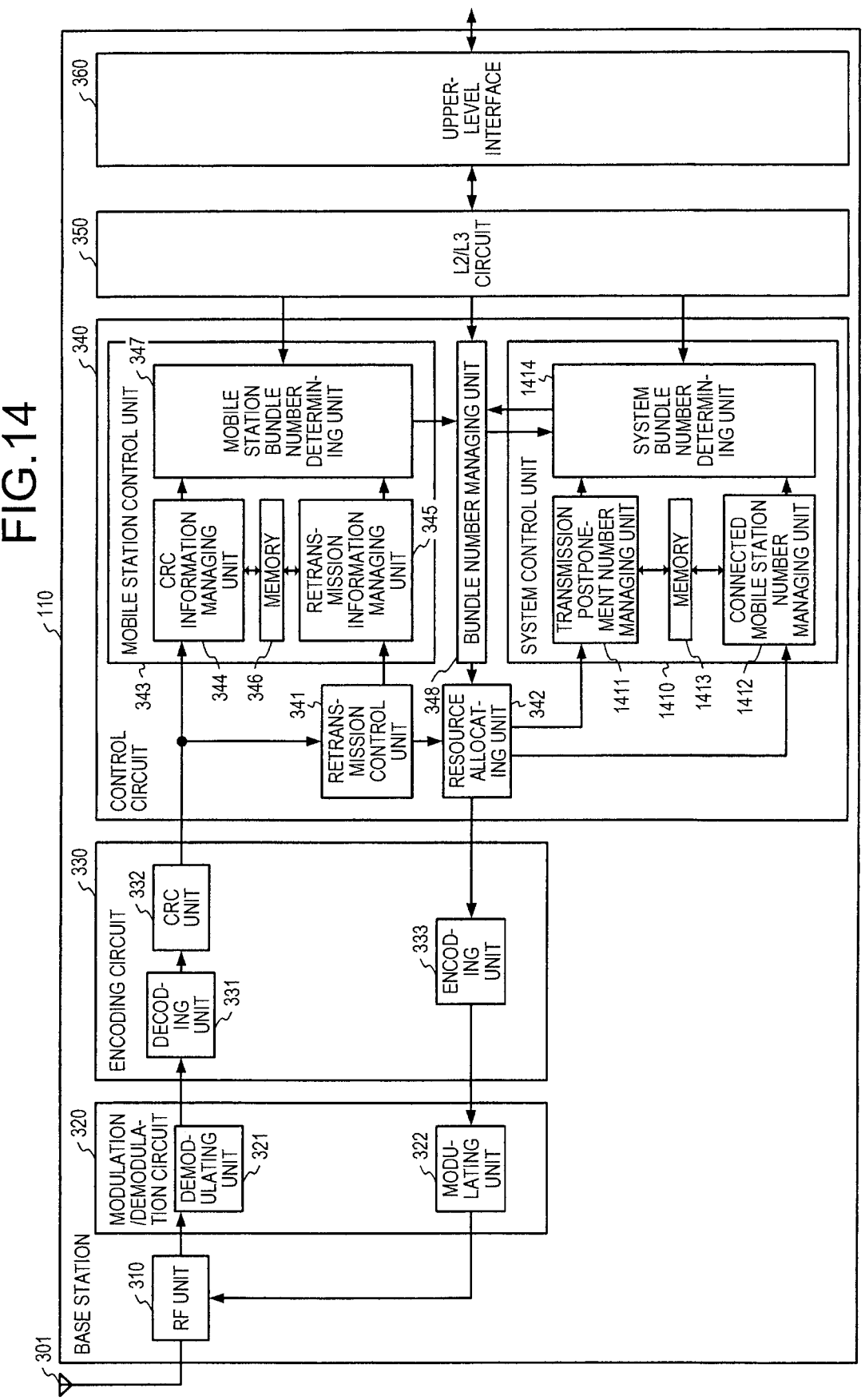
FIG. 14 is a diagram of an example of a configuration of the base station according to a second embodiment.

FIG. 14 is a diagram of an example of a configuration of the base station according to the second embodiment. In FIG. 14, the same portions as those described in FIG. 3 are denoted by the same reference numerals and will not be described. As depicted in FIG. 14, the base station 110 according to the second embodiment includes a system control unit 1410 in addition to the configuration depicted in FIG. 3.

The resource allocating unit 342 outputs, to the system control unit 1410, transmission postponement number information that indicates the number of times (e.g., the number of sub-frames) that the packet transmission is postponed due to contention for resource allocation to the mobile station 120. The resource allocating unit 342 outputs, to the system control unit 1410, connected mobile station number information that indicates the number of the mobile stations 120 connected to the base station 110. The bundle number managing unit 348 first outputs to the system control unit 1410, the TTI bundle number information output from the control circuit 340 and outputs to the resource allocating unit 342, a setting request signal including the TTI bundle number information returned from the system control unit 1410.

The system control unit 1410 further controls the respective TTI bundle numbers of the mobile stations 120 based on the TTI bundle number control for each of the mobile stations 120 by the control circuit 340. The TTI bundle number control by the system control unit 1410 is provided, for example, on a long-term basis (e.g., several [s] to several tens of [s]). The TTI bundle number control by the system control unit 1410 is mainly provide in the direction suppressing the TTI bundle number. The system control unit 1410 includes a transmission postponement number managing unit 1411, a connected mobile station number managing unit 1412, a memory 1413, and a system bundle number determining unit 1414.

The transmission postponement number managing unit 1411 acquires and manages the transmission postponement number information output from the resource allocating unit 342. For example, the transmission postponement number managing unit 1411 stores the transmission postponement number information in the memory 1413 and accumulates and outputs the transmission postponement number to the system bundle number determining unit 1414 based on the transmission postponement number information stored in the memory 1413.

The connected mobile station number managing unit 1412 acquires and manages the connected mobile station number output from the resource allocating unit 342. For example, the connected mobile station number managing unit 1412 stores the connected mobile station number information in the memory 1413 and, accumulates and outputs the connected mobile station number to the system bundle number determining unit 1414 based on the connected mobile station number stored in the memory 1413.

The system bundle number determining unit 1414 determines the TTI bundle number of the mobile station 120 based on the TTI bundle number information from the bundle number managing unit 348, the transmission postponement number from the transmission postponement number managing unit 1411, and the connected mobile station number from the connected mobile station number managing unit 1412.

The system bundle number determining unit 1414 uses a control signal output from the L2/L3 circuit 350 to set control parameters such as a threshold value and a determination period of a determining process of the TTI bundle number. The system bundle number determining unit 1414 outputs TTI bundle number information that indicates the determined TTI bundle number of each of the mobile stations 120 to the bundle number managing unit 348.

For example, based on a frequency of suspension of transmission of packets by the mobile station 120, the number of connections of the mobile station 120 to the base station 110, etc., the system control unit 1410 provides the dynamic TTI bundle number control on the basis of a system in consideration of a degree of congestion of resources. As a result, the appropriate TTI bundle number can be set accordingly.

Figure 15:
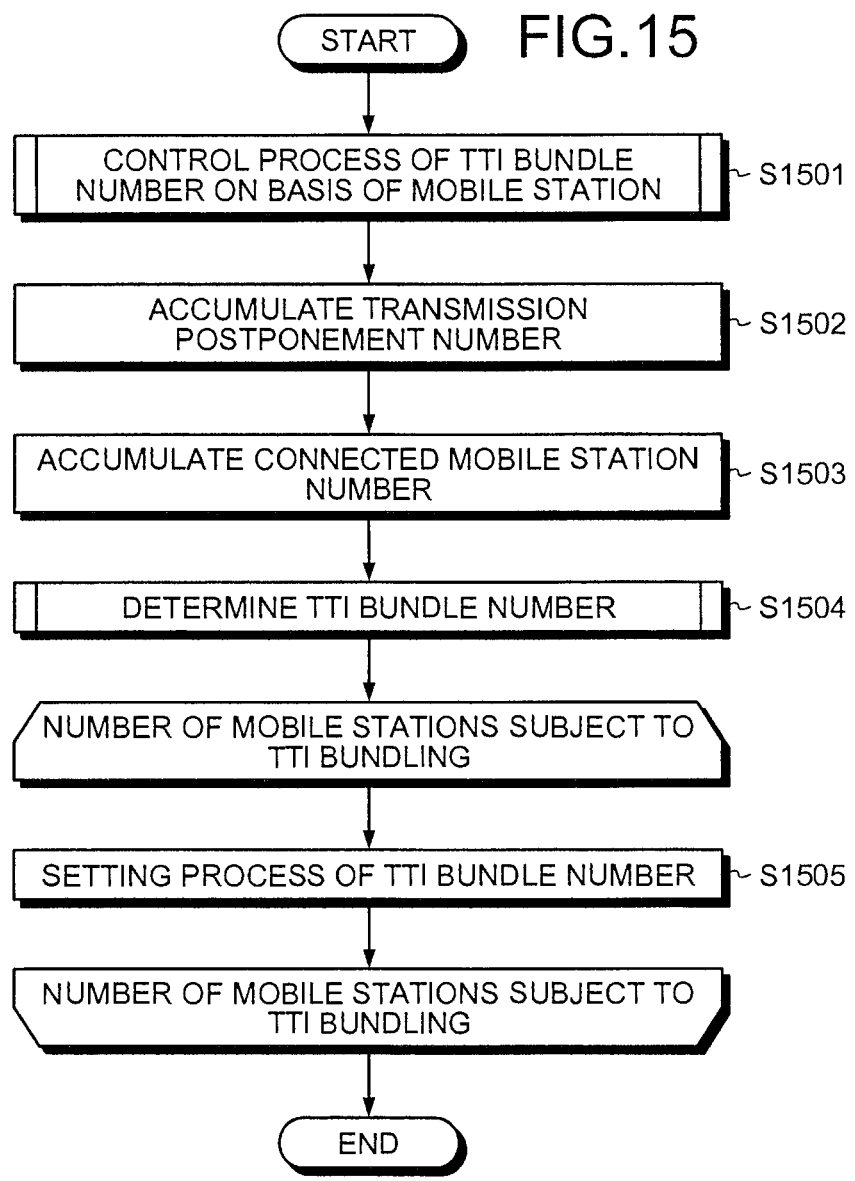
FIG. 15 is a flowchart of an example of the TTI bundle number control according to the second embodiment.

FIG. 15 is a flowchart of an example of the TTI bundle number control according to the second embodiment. The control circuit 340 of the base station 110 depicted in FIG. 14 executes a control process of the TTI bundle number on the basis of a mobile station (step S1501). The control process of the TTI bundle number on the basis of a mobile station is the process depicted in FIG. 4, for example.

The transmission postponement number managing unit 1411 accumulates the transmission postponement number in the base station 110 based on the transmission postponement number information stored in the memory 1413 (step S1502). The connected mobile station number managing unit 1412 accumulates the connected mobile station number in the base station 110 based on the connected mobile station number information stored in the memory 1413 (step S1503).

The system bundle number determining unit 1414 determines the TTI bundle number based on the transmission postponement number accumulated at step S1502 and the connected mobile station number accumulated at step S1503 (step S1504). The system bundle number determining unit 1414 then executes step S1505 for each of the object mobile stations of the TTI bundling. For example, the system bundle number determining unit 1414 executes a setting process of the TTI bundle number for an object mobile station (step S1505) and terminates the series of operations.

Figure 16:
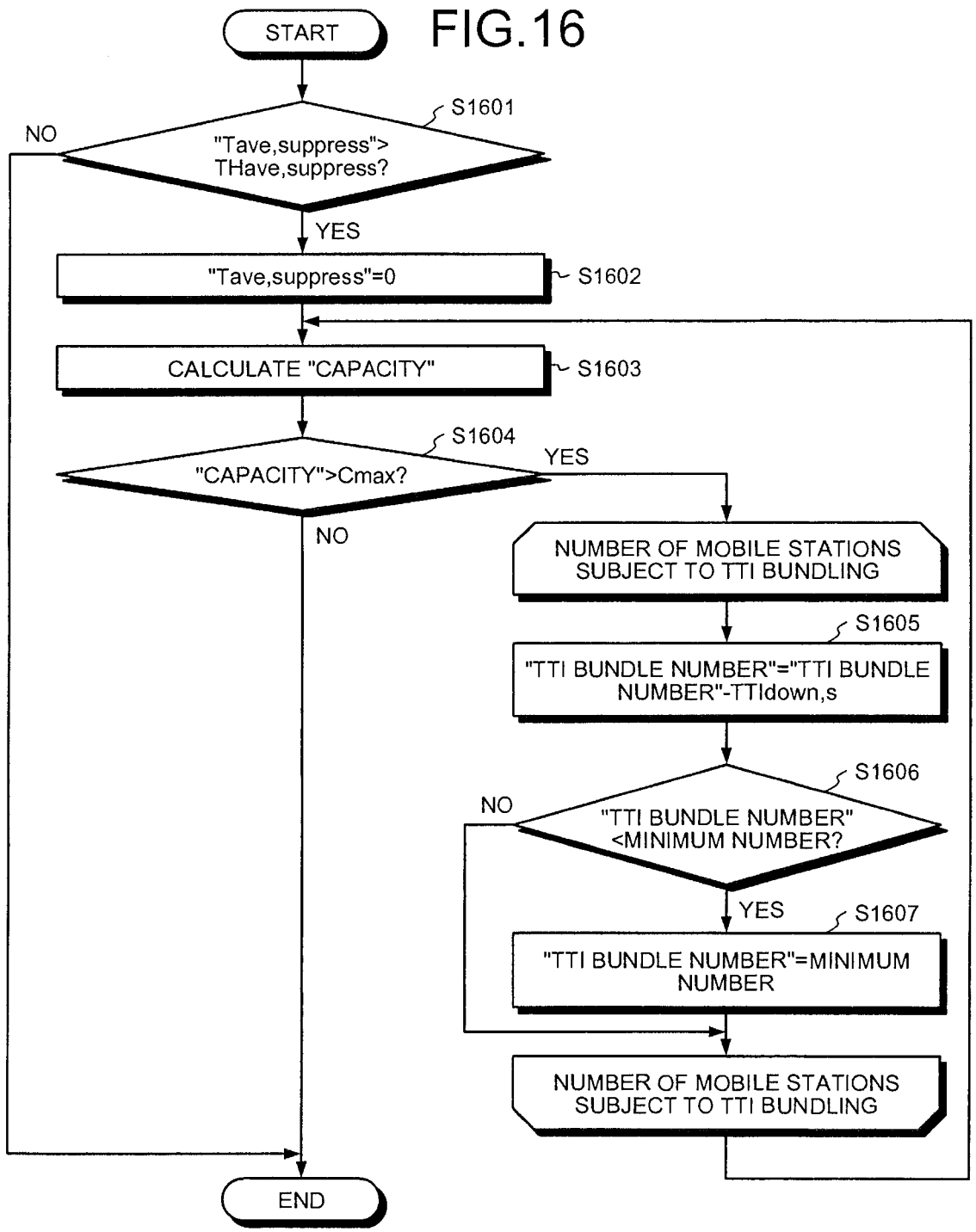
FIG. 16 is a flowchart of a first specific example of the determining process of the TTI bundle number on the basis of a system.

FIG. 16 is a flowchart of a first specific example of the determining process of the TTI bundle number on the basis of a system. The system bundle number determining unit 1414 executes, for example, a process depicted in FIG. 16 at step S1504 depicted in FIG. 15 to determine the TTI bundle number of the object mobile stations of the TTI bundling. First, the system bundle number determining unit 1414 determines whether an "elapsed time" (Tave,suppress) exceeds an elapsed time threshold value (THave,suppress) (step S1601).

The "elapsed time" is information that indicates an elapsed time from the last calculation of a "capacity" and is stored in the memory 1413, for example. The "capacity" is information that indicates a load amount of the base station 110 due to communication with the mobile stations 120 connected to the base station 110 and is stored in the memory 1413, for example. The "capacity" is calculated, for example, based on the number of the mobile stations 120 connected to the base station 110 and the respective "TTI bundle numbers" of the mobile stations 120 connected to the base station 110 (see, e.g., FIG. 19).

If the "elapsed time" does not exceed the elapsed time threshold value at step S1601 (step S1601: NO), the system bundle number determining unit 1414 terminates the series of operations. If the "elapsed time" exceeds the elapsed time threshold value (step S1601: YES), the system bundle number determining unit 1414 sets the "elapsed time" to zero (step S1602).

The system bundle number determining unit 1414 then calculates the "capacity" in the base station 110 (step S1603). The "elapsed time" hereinafter indicates an elapsed time from the execution of step S1603. The system bundle number determining unit 1414 determines whether the "capacity" calculated at step S1603 exceeds a predetermined maximum capacity Cmax (step S1604).

If the "capacity" exceeds the predetermined maximum capacity Cmax at step S1604 (step S1604: YES), the system bundle number determining unit 1414 executes steps S1605 to S1607 for each of object mobile stations of the TTI bundling. For example, the system bundle number determining unit 1414 subtracts TTIdown,s from the current "TTI bundle number" (step S1605). TTIdown,s is a unit of decrease in the "TTI bundle number".

The system bundle number determining unit 1414 determines whether the current "TTI bundle number" is smaller than a predetermined minimum number (step S1606). If the current "TTI bundle number" is not smaller than the predetermined minimum number (step S1606: NO), the system bundle number determining unit 1414 shifts the process to the next object mobile station of the TTI bundling. If the current "TTI bundle number" is smaller than the predetermined minimum number (step S1606: YES), the system bundle number determining unit 1414 sets the "TTI bundle number" to the predetermined minimum number (step S1607).

After executing steps S1605 to S1607 for each of the object mobile stations of the TTI bundling, the system bundle number determining unit 1414 returns to step S1603. If the "capacity" does not exceed the predetermined maximum capacity Cmax at step S1604 (step S1604: NO), the system bundle number determining unit 1414 terminates the series of operations.

With the process depicted in FIG. 16, the base station 110 can calculate the "capacity" in the base station 110 based on the number of the mobile stations 120 connected to the base station 110 and cause the respective "TTI bundle numbers" of the mobile stations 120 to be set based on the calculated "capacity". For example, the base station 110 reduces the respective "TTI bundle numbers" of the mobile stations 120 if the "capacity" in the base station 110 exceeds the predetermined maximum capacity Cmax (threshold value).

Figure 17:
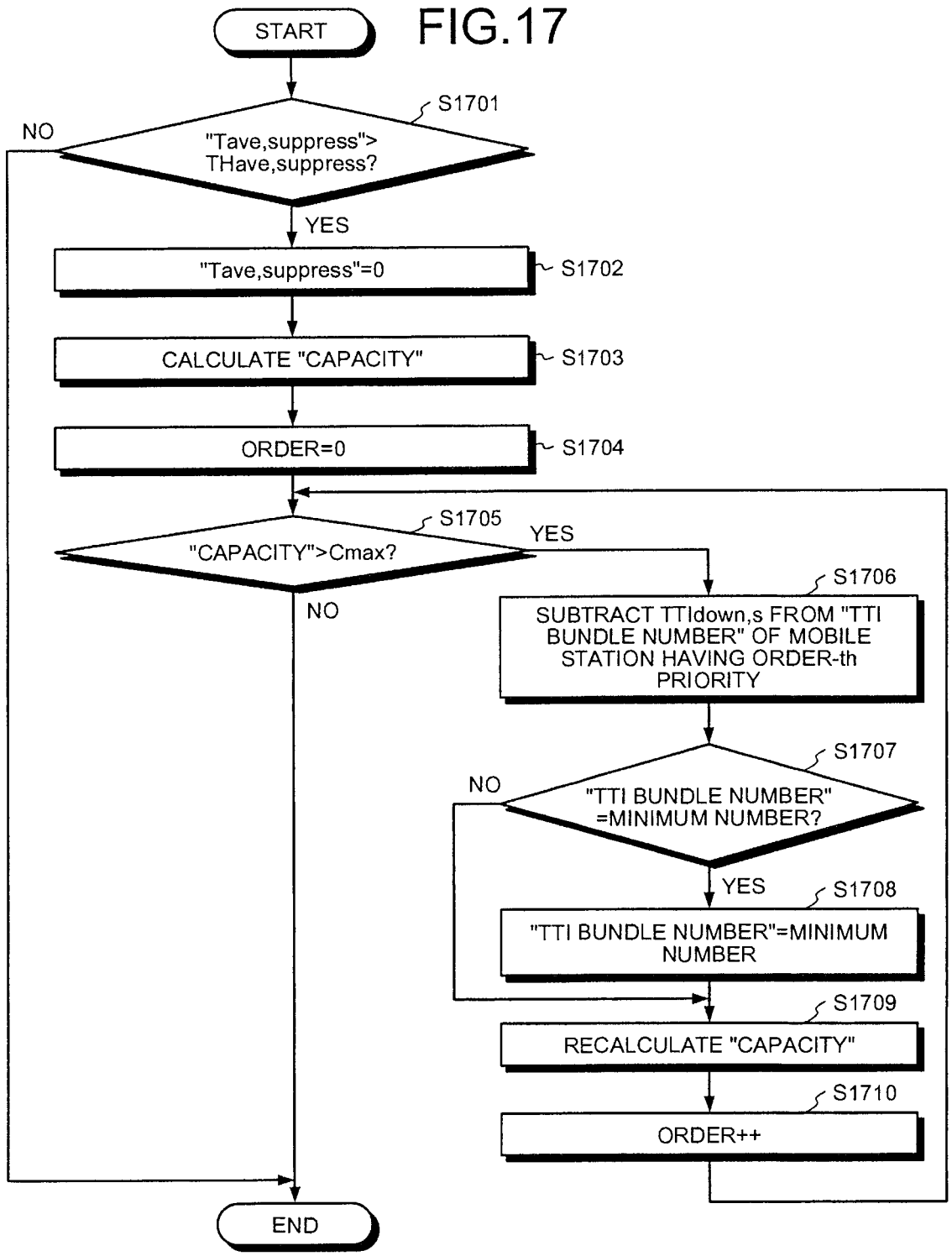
FIG. 17 is a flowchart of a second specific example of the determining process of the TTI bundle number on the basis of a system.

FIG. 17 is a flowchart of a second specific example of the determining process of the TTI bundle number on the basis of a system. The system bundle number determining unit 1414 may execute, for example, a process depicted in FIG. 17 at step S1504 depicted in FIG. 15 to determine the TTI bundle numbers of the object mobile stations of the TTI bundling. Steps S1701 to S1703 depicted in FIG. 17 are the same as steps S1601 to S1603 depicted in FIG. 16.

After step S1703, the system bundle number determining unit 1414 sets "order" to zero (step S1704). The order is an index (0, 1, 2, . . . ) of priority (degree of priority) of the object mobile stations of the TTI bundling. The system bundle number determining unit 1414 determines whether the "capacity" calculated at step S1703 exceeds the predetermined maximum capacity Cmax (step S1705).

If the "capacity" exceeds the maximum capacity Cmax at step S1705 (step S1705: YES), the system bundle number determining unit 1414 proceeds to step S1706. For example, the system bundle number determining unit 1414 subtracts TTIdown,s from the "TTI bundle number" of a mobile station having the order-th priority among the object mobile stations of the TTI bundling (step S1706).

The system bundle number determining unit 1414 determines whether the current "TTI bundle number" of the mobile station having the order-th priority is smaller than a predetermined minimum number (step S1707). If the current "TTI bundle number" is not smaller than the predetermined minimum number (step S1707: NO), the system bundle number determining unit 1414 proceeds to step S1709. If the current "TTI bundle number" is smaller than the predetermined minimum number (step S1707: YES), the system bundle number determining unit 1414 sets the "TTI bundle number" of the mobile station having the order-th priority to the predetermined minimum number (step S1708). As a result, the "TTI bundle number" can be prevented from falling below the predetermined minimum number.

The system bundle number determining unit 1414 recalculates the "capacity" of the base station 110 (step S1709). The system bundle number determining unit 1414 increments the order (step S1710) and returns to step S1705. If the "capacity" does not exceed the predetermined maximum capacity Cmax at step S1705 (step S1705: NO), the system bundle number determining unit 1414 terminates the series of operations.

With the process depicted in FIG. 17, the base station 110 can cause the respective "TTI bundle numbers" of the mobile stations 120 to be set based on the "capacity" in the base station 110. For example, the base station 110 reduces the "TTI bundle numbers" of the mobile stations 120 in ascending order of priority if the "capacity" in the base station 110 exceeds the maximum capacity Cmax.

FIG. 18 is a flowchart of a third specific example of the determining process of the TTI bundle number on the basis of a system. The system bundle number determining unit 1414 may execute, for example, a process depicted in FIG. 18 at step S1504 depicted in FIG. 15 to determine the TTI bundle numbers of the object mobile stations of the TTI bundling. In FIG. 18, order is an index (0, 1, 2, . . . ) that indicates descending order of the elapsed time from the last change in the "TTI bundling" within the object mobile stations of the TTI bundling. Steps S1801 to S1805 depicted in FIG. 18 are the same as steps S1701 to S1705 depicted in FIG. 17.

If the "capacity" exceeds the maximum capacity Cmax at step S1805, the system bundle number determining unit 1414 reduces the "TTI bundle number" of a mobile station having the order-th-longest elapsed time from the last change in the "TTI bundle number". For example, the system bundle number determining unit 1414 subtracts TTIdown,s from the "TTI bundle number" of a mobile station having the order-th-longest elapsed time from the last change in the "TTI bundle number" (step S1806). Steps S1807 to S1810 depicted in FIG. 18 are the same as steps S1707 to S1710 depicted in FIG. 17.

With the process depicted in FIG. 18, the base station 110 can cause the respective "TTI bundle numbers" of the mobile stations 120 to be set based on the "capacity" in the base station 110. For example, the base station 110 reduces the "TTI bundle numbers" of the mobile stations 120 in descending order of the elapsed time from the last change in the "TTI bundle number" if the "capacity" in the base station 110 exceeds the maximum capacity Cmax.

FIG. 19 is a diagram of an operation example of the first to third specific examples of the determining process of the TTI bundle number on the basis of a system. In FIG. 19, the horizontal axis indicates time and the vertical axis indicates a capacity C in the base station 110. A period T on the horizontal axis is a time corresponding to the elapsed time threshold value described above and indicates a calculation period of the capacity C (e.g., several [s] to several tens of [s]). The capacity C is the "capacity" (load amount) described above. The system bundle number determining unit 1414 can calculate the "capacity" from Equation (1), for example.

Capacity $C$=number of mobile stations in dynamic state×coefficient 1+number of mobile stations in persistent state×coefficient 2+sum of TTI bundle numbers of object mobile stations of TTI bundling×coefficient 3     (1)

The connected mobile station number managing unit 1412 accumulates and outputs the number of mobile stations in the dynamic state and the number of mobile stations in the persistent state to the system bundle number determining unit 1414. The sum of the TTI bundle numbers of the object mobile stations of the TTI bundling is the sum of the "TTI bundle numbers" of the mobile stations indicated by the TTI bundle number information output from the bundle number managing unit 348. The coefficients 1 to 3 may be stored in advance in the memory 1413 or may be set by an upper-level communication station via the L2/L3 circuit 350 and the upper-level interface 360.

In the first to third specific examples of the determining process of the TTI bundle number on the basis of a system depicted in FIGS. 16 to 18, the system control unit 1410 calculates the capacity C (load amount) of the base station 110 with the period T based on the number of the mobile stations 120 connected to the base station 110. If the capacity C exceeds the maximum capacity Cmax (reference numerals 1901 to 1903), the system control unit 1410 provides the control of reducing the "TTI bundle number" to suppress the capacity C. The maximum capacity Cmax is an allowable range in the system (e.g., about 80% of limit performance).

FIG. 20 is a diagram of an operation example of the first specific example of the determining process of the TTI bundle number on the basis of a system. In the first specific example of the determining process of the TTI bundle number on the basis of a system, the system control unit 1410 approximates the capacity C with the period T. If the capacity C exceeds the maximum capacity Cmax, the system control unit 1410 collectively reduces the "TTI bundle numbers" of the object mobile stations of the TTI bundling until the capacity C becomes less than or equal to the maximum capacity Cmax (reference numerals 2001 to 2003).

For example, at the times indicated by reference numerals 2001 and 2002, the capacity C becomes less than or equal to the maximum capacity Cmax each time the "TTI bundle numbers" of the object mobile stations of the TTI bundling are reduced once. At the time indicated by reference numeral 2003, the capacity C becomes less than or equal to the maximum capacity Cmax when the "TTI bundle numbers" of the object mobile stations of the TTI bundling are reduced twice. As a result, the processing load and delay in the base station 110 can be alleviated. The "TTI bundle numbers" can be reduced equally in the object mobile stations of the TTI bundling.

FIG. 21 is a diagram of an operation example of the second and third specific examples of the determining process of the TTI bundle number on the basis of a system. In the second specific example of the determining process of the TTI bundle number on the basis of a system depicted in FIG. 17, the system control unit 1410 calculates the capacity C when the period T has elapsed from the last calculation of the capacity C. If the calculated capacity C exceeds the maximum capacity Cmax, the system control unit 1410 provides the reduction control of the "TTI bundle number" in order from the mobile station 120 having the lowest priority until the capacity C becomes less than or equal to the maximum capacity Cmax (reference numerals 2101 to 2103). The system control unit 1410 provides the reduction control of the "TTI bundle number" to each of the mobile stations 120 and terminates the reduction control of the "TTI bundle number" when the capacity C becomes less than or equal to the maximum capacity Cmax.

For example, at the time indicated by reference numeral 2101, the capacity C becomes less than or equal to the maximum capacity Cmax when the reduction control of the "TTI bundle number" is provided to the three mobile stations 120. At the time indicated by reference numeral 2102, the capacity C becomes less than or equal to the maximum capacity Cmax when the reduction control of the "TTI bundle number" is provided to the one mobile station 120. At the time indicated by reference numeral 2103, the capacity C becomes less than or equal to the maximum capacity Cmax when the reduction control of the "TTI bundle number" is provided to the five mobile stations 120.

For example, it is assumed that the number of object mobile stations of the TTI bundling is ten and that the reduction control of the "TTI bundle number" is provided five times until the capacity C becomes less than or equal to the maximum capacity Cmax. In this case, the "TTI bundle numbers" are maintained in the five mobile stations 120 having higher priority. As a result, the control can be provided such that the mobile stations are differentiated so as to preferentially maintain the "TTI bundle numbers" of the mobile stations 120 having higher priority (degree of priority) even if the load of the base station 110 increases. The priority of the mobile stations is set based on reception quality and user's billing information, for example.

In the third specific example of the determining process of the TTI bundle number on the basis of a system depicted in FIG. 18, the system control unit 1410 calculates the capacity C when the period T has elapsed from the last calculation of the capacity. If the calculated capacity C exceeds the maximum capacity Cmax, the system control unit 1410 provides the reduction control of the "TTI bundle number" in order from the mobile station 120 having the longest elapsed time from the last change in the "TTI bundle number" until the capacity C becomes less than or equal to the maximum capacity Cmax (reference numerals 2101 to 2103). The system control unit 1410 provides the reduction control of the "TTI bundle number" to one of the mobile stations 120 at a time and terminates the reduction control of the "TTI bundle number" when the capacity C becomes less than or equal to the maximum capacity Cmax.

Although it is considered that the mobile station 120 having the "TTI bundle number" unchanged for a long time is the mobile station 120 with relatively stable reception quality, the reception quality may not significantly be reduced in practice even if the reduction control of the "TTI bundle number" is provided. Therefore, the whole system can be optimized by preferentially providing the reduction control of the "TTI bundle number" to the mobile stations 120 having a longer elapsed time from the last change in the "TTI bundle number".

FIG. 22 is a flowchart of a fourth specific example of the determining process of the TTI bundle number on the basis of a system. The system bundle number determining unit 1414 may execute, for example, a process depicted in FIG. 22 at step S1504 depicted in FIG. 15 to determine the TTI bundle numbers of the object mobile stations of the TTI bundling. First, the system bundle number determining unit 1414 increments an "OK/NG accumulated time" (step S2201).

The "OK/NG accumulated time" is information that indicates a time acquired by accumulating Nng,s and Nok,s and is stored in the memory 1413, for example. Nng,s is information that indicates the number of times (e.g., the number of sub-frames) that the ensuring of a resource for the TI bundling is unsuccessful, and is stored in the memory 1413, for example. Nok,s is information that indicates the number of times (e.g., the number of sub-frames) that the ensuring of a resource for the TI bundling is successful, and is stored in the memory 1413, for example.

The system bundle number determining unit 1414 determines whether the "OK/NG accumulated time" exceeds an elapsed time threshold value (THave,suppress) (step S2202). If the "OK/NG accumulated time" does not exceed the elapsed time threshold value (step S2202: NO), the system bundle number determining unit 1414 terminates the series of operations.

If the "OK/NG accumulated time" exceeds the elapsed time threshold value at step S2202 (step S2202: YES), the system bundle number determining unit 1414 sets the "OK/NG accumulated time" to zero (step S2203). The system bundle number determining unit 1414 calculates an "NG rate" based on accumulated Nng,s and Nok,s (step S2204). The "NG rate" is information that indicates a rate of failure in ensuring the resource for the TTI bundling and can be calculated from Nng,s/(Nng,s+Nok,s), for example.

The system bundle number determining unit 1414 determines whether the "NG rate" calculated at step S2204 exceeds an NG rate threshold value (THng,suppress) (step S2205). If the "NG rate" does not exceed the NG rate threshold value (step S2205: NO), the system bundle number determining unit 1414 terminates the series of operations.

If the "NG rate" exceeds the NG rate threshold value (step S2205: YES), the system bundle number determining unit 1414 executes steps S2206 to S2208 for each of the object mobile stations of the TTI bundling. For example, the system bundle number determining unit 1414 subtracts TTIdown,s from the "TTI bundle number" of the object mobile station (step S2206). TTIdown,s is a unit of decrease in the "TTI bundle number".

The system bundle number determining unit 1414 determines whether the "TTI bundle number" of the object mobile station is smaller than a predetermined minimum number (step S2207). If the "TTI bundle number" is not smaller than the predetermined minimum number (step S2207: NO), the process is shifted to the next object mobile station. If the "TTI bundle number" is smaller than the predetermined minimum number (step S2207: YES), the system bundle number determining unit 1414 sets the "TTI bundle number" to the predetermined minimum number (step S2208). As a result, the "TTI bundle number" can be prevented from falling below the predetermined minimum number.

After executing steps S2206 to S2208 for each of the object mobile stations of the TTI bundling, the system bundle number determining unit 1414 sets Nok,s to zero (step S2209). The system bundle number determining unit 1414 sets Nng,s to zero (step S2210) and terminates the series of operations.

With the process depicted in FIG. 22, the base station 110 can cause the respective "TTI bundle numbers" of the mobile stations 120 to be set based on the rate ("NG rate") of failure in ensuring the resource for the TTI bundling. For example, the base station 110 reduces the "TTI bundle numbers" of the mobile stations 120 if a rate of failure in ensuring the resource for the TTI bundling exceeds the NG rate threshold value.

FIGS. 23 and 24 are diagrams of an operation example of the fourth specific example of the determining process of the TTI bundle number on the basis of a system. In FIGS. 23 and 24, the horizontal axis indicates sub-frame (time) and the vertical axis indicates resource (frequency). For example, as depicted in FIG. 23, it is assumed that packet transmissions (1 to 4) through the TTI bundling of the mobile station 120 (UE#0) are allocated to sub-frames "0" to "3" of a resource "0". It is assumed that packet transmissions (1 to 4) through the TTI bundling of the mobile station 120 (UE#1) are allocated to sub-frames "1" to "4" of a resource "1".

It is assumed that packet transmissions (1 to 4) through the TTI bundling of the mobile station 120 (UE#3) are allocated to sub-frames "0" to "3" of a resource "3". In this state, a case of allocating four packet transmissions (1 to 4) of the mobile station 120 (UE#4) to a sub-frame "2" and subsequent sub-frames will be described. It is assumed that Nok,s=Nng,s=0 is satisfied.

Since sub-frames "2" to "5" of the resource "2" are available in this state, the four packet transmissions (1 to 4) of the mobile station 120 (UE#4) can be allocated. Therefore, Nok,s is incremented to Nok,s=1.

For example, as depicted in FIG. 24, it is assumed that packet transmissions (1 to 4) through the TTI bundling of the mobile station 120 (UE#2) are further allocated to the sub-frames "0" to "3" of the resource "2" in the state depicted in FIG. 23. Since the sub-frames "2" to "5" of the resource "2" are not available in this state, the packet transmissions (1 to 4) of the mobile station 120 (UE#4) are postponed until the sub-frame "4".

In this case, the resource allocation for the mobile station 120 (UE#4) fails in two sub-frames, i.e., the sub-frames "2" and "3" and therefore, Nng,s is incremented twice to Nng,s=2. The resource allocation for the mobile station 120 (UE#4) is successful in the sub-frame "4", resulting in Nok,s=1.

As described above, when the object mobile station 120 of the TTI bundling transmits packets, if transmission resource can be ensured, the system control unit 1410 increments Nok,s. If transmission resource cannot be ensured, the system control unit 1410 accumulates the waiting time until transmission resource is ensured into Nng,s. The system control unit 1410 provides the reduction control of the "TTI bundle number" of the mobile station 120 based on the "NG rate" calculated based on Nok,s and Nng,s.

Although the reduction control of the "TTI bundle numbers" of the object mobile stations of the TTI bundling is collectively provided in this description, the reduction control of the "TTI bundle number" may be provided for each of the object mobile stations of the TTI bundling. For example, an "NG rate reduction amount" is defined for the case of providing the reduction control of the "TTI bundle number" to one of the mobile stations 120. For example, the "NG rate reduction amount" per TTI is defined as a value acquired by dividing the "NG rate" by the sum of the "TTI bundle numbers" of the object mobile stations of the TTI bundling.

Each time the reduction control of the "TTI bundle number" is provided to one of the mobile stations 120, the "NG rate reduction amount" is subtracted from the "NG rate" and the reduction control of the "TTI bundle number" is stopped if the "NG rate" becomes less than or equal to the NG rate threshold value. For example, it is assumed that the number of the object mobile stations of the TTI bundling is ten, that the "TTI bundle number" of each of the object mobile stations of the TTI bundling is four, that TTIdown,s is one, that the "NG rate" is 0.6, and that the NG rate threshold value is 0.5. In this case, since the "NG rate reduction amount" is $0.6/(10 \times 4) = 0.015$, because of $0.6 - 0.015 \times 7 = 0.495 < 0.5$, the reduction control of the "TTI bundle number" only needs to be provided to seven mobile stations 120.

According to the fourth specific example of the determining process of the TTI bundle number on the basis of a system, the reduction control of the "TTI bundle number" can be provided according to availability of transmission resources. Therefore, if transmission is frequently postponed because of contention for resources, the TTI bundle number can be suppressed dynamically on the basis of a system to decrease contention for resources, thereby reducing system delay due to transmission suspension.

According to the communication system 100 of the second embodiment, the effect of the communication system 100 of the first embodiment can be obtained and the TTI bundle number control can be provided on the basis of a system. As a result, for example, if a load amount of the base station 110 increases or if transmission is frequently postponed because of contention for resources, the TTI bundle number can be controlled on the basis of a system to reduce system delay.

As described above, according to the base station, the mobile station, the control method, the setting method, and the communication system, the communication efficiency can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station configured to communicate with a mobile station that continuously transmits a predetermined number of the same packets for predetermined time intervals, the base station comprising:
   a measuring unit configured to measure reception quality of packets received from the mobile station, among the predetermined number of the same packets that are continuous; and
   a control unit configured to cause the mobile station to set the predetermined number based on the reception quality measured by the measuring unit,
   wherein the measuring unit is further configured to measure the reception quality of packets including an error detection result of the packets, and
   wherein the control unit is further configured to cause the predetermined number to be set based on a number of successive times that packets of a first transmission by the mobile station are subject to a retransmission operation.

2. The base station according to claim 1, wherein:
   the measuring unit is further configured to measure reception quality for a plurality of mobile stations, respectively, and
   the control unit is further configured to provide control for each of the mobile stations.

3. The base station according to claim 1, wherein the control unit is further configured to cause the predetermined number to be increased, if the number of times that the packets of the first transmission by the mobile station are subject to the retransmission operation becomes greater than or equal to a threshold value.

4. The base station according to claim 1, wherein the control unit is further configured to cause the predetermined number to be set based on a number of successive times that the packets from the mobile station are error-free within a number of transmissions fewer than the current predetermined number in succession.

5. The base station according to claim 4, wherein the control unit is further configured to cause the predetermined number to be reduced, if the number of successive times becomes greater than or equal to a threshold value.

6. The base station according to claim 1, wherein the control unit is further configured to cause the predetermined number to be set based on a number of transmissions until the packets from the mobile station become error-free.

7. The base station according to claim 6, wherein the control unit is further configured to cause the number of transmissions to be accumulated for a predetermined number of times and the predetermined number to be set based on an average value of an accumulated number.

8. The base station according to claim 7, wherein the control unit is further configured to cause the predetermined number to be increased, if the average value is larger than the current predetermined number and the predetermined number to be decreased, if the average value is smaller than the current predetermined number.

9. The base station according to claim 7, wherein the control unit is further configured to cause a number closest to the average value to be selected and the predetermined number to be set as the selected number.

10. The base station according to claim 1, wherein the measuring unit is further configured to measure the reception quality including the number of retransmissions of the packets by the mobile station, based on an error result of a packet group transmitted in transmission time intervals of the predetermined number.

11. The base station according to claim 1, wherein the control unit is further configured to cause the predetermined number to be set based on a mobile station count of a plurality of the mobile stations.

12. The base station according to claim 11, wherein:
the control unit is further configured to cause a load amount of the base station due to communication with the mobile stations to be calculated based on the mobile station count and
the predetermined number for each of the mobile stations to be set based on the calculated load amount.

13. The base station according to claim 12, wherein the control unit is further configured to cause the predetermined number for each of the mobile stations to be reduced, if the load amount exceeds a threshold value.

14. The base station according to claim 13, wherein the control unit is further configured to cause the predetermined number for each of the mobile stations to be collectively reduced until the load amount becomes less than or equal to the threshold value.

15. The base station according to claim 13, wherein the control unit is further configured to cause the predetermined number for a mobile station having lower priority among the mobile stations to be preferentially reduced until the load amount becomes less than or equal to the threshold value.

16. The base station according to claim 13, wherein the control unit is further configured to cause the predetermined number for a mobile station having a longer elapsed time since a last change in the predetermined number among the mobile stations to be preferentially reduced until the load amount becomes less than or equal to the threshold value.

17. The base station according to claim 1, wherein the control unit is further configured to cause the predetermined number for each mobile station of a plurality of the mobile stations to be set based on a rate of failure in allocation of resources to the mobile stations.

18. The base station according to claim 17, wherein the control unit is further configured to cause the predetermined number for each of the mobile stations to be reduced, if the rate of failure exceeds a threshold value.

19. The base station according to claim 1, wherein the control unit includes:
a determining unit configured to determine the predetermined number based on reception quality measured by the measuring unit, and
a transmitting unit configured to transmit to the mobile station, a setting request signal indicating that the predetermined number determined by the determining unit is to be set.

20. A mobile station comprising:
a transmitting unit configured to continuously transmit to a base station, a predetermined number of same packets for predetermined time intervals;
a receiving unit configured to receive from the base station a setting request signal that indicates the predetermined number determined by the base station and determined based on reception quality of packets transmitted by the transmitting unit among the predetermined number of the same packets that are continuous; and
a setting unit configured to set the predetermined number of the transmitting unit to be the predetermined number indicated by the setting request signal received by the receiving unit,
wherein a measuring unit of the base station is configured to measure the reception quality of packets including an error detection result of the packets, and
wherein a control unit of the base station is configured to cause the predetermined number to be set based on a number of successive times that packets of a first transmission by the mobile station are subject to a retransmission operation.

21. A control method of a base station configured to communicate with a mobile station that continuously transmits a predetermined number of same packets for predetermined time intervals, the control method comprising:
measuring, via a measuring unit of the base station, reception quality of packets received from the mobile station, among the predetermined number of the same packets that are continuous; and
causing, via a control unit of the base station, the mobile station to set the predetermined number based on the measured reception quality of packets,
wherein the measuring unit of the base station is configured to measure the reception quality of packets including an error detection result of the packets, and
wherein the control unit of the base station is configured to cause the predetermined number to be set based on a number of successive times that packets of a first transmission by the mobile station are subject to a retransmission operation.

22. A setting method of a mobile station that continuously transmits a predetermined number of same packets for predetermined time intervals to a base station, the setting method comprising:
receiving from the base station, a setting request signal that indicates the predetermined number determined by the base station and determined based on reception quality of transmitted packets among the predetermined number of the same packets that are continuous; and
setting the predetermined number of transmissions of the same packets to be the predetermined number indicated by the received setting request signal,
wherein a measuring unit of the base station is configured to measure the reception quality of packets including an error detection result of the packets, and
wherein a control unit of the base station is configured to cause the predetermined number to be set based on a number of successive times that packets of a first transmission by the mobile station are subject to a retransmission operation.

23. A communication system comprising:
a mobile station configured to continuously transmit a predetermined number of same packets for predetermined time intervals; and
a base station configured to cause the mobile station to set the predetermined number based on reception quality of packets received from the mobile station, among the predetermined number of the same packets that are continuous,
wherein a measuring unit of the base station is configured to measure the reception quality of packets including an error detection result of the packets, and
wherein a control unit of the base station is configured to cause the predetelmined number to be set based on a number of successive times that packets of a first transmission by the mobile station are subject to a retransmission operation.

* * * * *